US012761846B2

(12) United States Patent
Hidaka

(10) Patent No.: US 12,761,846 B2
(45) Date of Patent: Oct. 13, 2026

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Daichi Hidaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 18/627,013

(22) Filed: Apr. 4, 2024

(65) Prior Publication Data

US 2024/0345786 A1 Oct. 17, 2024

(30) Foreign Application Priority Data

Apr. 11, 2023 (JP) ................................ 2023-063874

(51) Int. Cl.
*G06F 3/12* (2006.01)

(52) U.S. Cl.
CPC .......... *G06F 3/1254* (2013.01); *G06F 3/1205* (2013.01); *G06F 3/1239* (2013.01); *G06F 3/1255* (2013.01); *G06F 3/1228* (2013.01)

(58) Field of Classification Search
None
See application file for complete search history.

(56) References Cited

U.S. PATENT DOCUMENTS 10,365,866 B2 * 7/2019 Yoshida ................ H04L 9/0897
10,936,263 B2 * 3/2021 Inoue ...................... H04L 67/51
11,520,533 B2 * 12/2022 Suzuki .................. G06F 3/1204
2024/0169779 A1 * 5/2024 Sakayama ................ G07C 9/25

FOREIGN PATENT DOCUMENTS

JP 2021108001 A 7/2021

* cited by examiner

*Primary Examiner* — Darryl V Dottin
(74) *Attorney, Agent, or Firm* — Canon U.S.A., Inc. IP Division

(57) ABSTRACT

A non-transitory storage medium stores an application that displays a print setting screen, wherein the application, when executed, causes an information processing apparatus to implement a control method includes obtaining first attribute information and second attribute information from a printing device, storing, in a storage unit, first information based on the obtained first attribute information and second information based on the obtained second attribute information, and controlling the print setting screen to be displayed based on the first information and the second information stored in the storage unit, wherein in a case where the second attribute information is not successfully obtained, information stored in the application in advance is stored as the second information in the storage unit.

15 Claims, 18 Drawing Sheets

FIG.3A

301

```
<?xml version="1.0" encoding="utf-8"?>
<PrintDeviceCapabilities...>
   ...
   <psk:PageMediaSize psf2:psftype="Feature">                                        302
      <psk:ISOA4 psf2:psftype="Option" psf2:default="true">
         <psk:MediaSizeWidth xsi:type="xsd:integer" psf2:psftype="ScoredProperty">210000</psk:MediaSizeWidth>
         <psk:MediaSizeHeight xsi:type="xsd:integer" psf2:psftype="ScoredProperty">297000</psk:MediaSizeHeight>
         <psk12:PortraitImageableSize...>3400,5000,203200,287000</psk12:PortraitImageableSize>
         <psk12:BorderlessImageableSize...>0,0,21000,297000</psk12:BorderlessImageableSize>
      </psk:ISOA4>
      <psk:ISOB5 psf2:psftype="Option" psf2:default="false">
         <psk:MediaSizeWidth xsi:type="xsd:integer" psf2:psftype="ScoredProperty">18200</psk:MediaSizeWidth>
         <psk:MediaSizeHeight xsi:type="xsd:integer" psf2:psftype="ScoredProperty">25700</psk:MediaSizeHeight>
         <psk12:PortraitImageableSize...>3400,5000,175200,247000</psk12:PortraitImageableSize>
         <psk12:BorderlessImageableSize...>0,0,182000,257000</psk12:BorderlessImageableSize>
      </psk:ISOB5>
      <psk:ISOA5 psf2:psftype="Option" psf2:default="false">
         <psk:MediaSizeWidth xsi:type="xsd:integer" psf2:psftype="ScoredProperty">148000</psk:MediaSizeWidth>
         <psk:MediaSizeHeight xsi:type="xsd:integer" psf2:psftype="ScoredProperty">210000</psk:MediaSizeHeight>
         <psk12:PortraitImageableSize ...>3400,5000,141200,200000</psk12:PortraitImageableSize>
         <psk12:BorderlessImageableSize...>0,0,148000,210000</psk12:BorderlessImageableSize>
      </psk:ISOA5>
   </psk:PageMediaSize>

   <psk:PageBorderless psf2:psftype="Feature">
      <psk:None psf2:psftype="Option" psf2:default="true"/>   ~303
      <psk:Borderless psf2:psftype="Option"/>
   </psk:PageBorderless>

   <psk:PageMediaType psf2:psftype="Feature">
      <psk:AutoSelect ... psf2:psftype="Option" psf2:default="true"/>   ~304
      <psk:Plain ... psf2:psftype="Option" psf2:default="false"/>
      <psk:Photographic ... psf2:psftype="Option" psf2:default="false"/>
      <psk:EnvelopePlain ... psf2:psftype="Option" psf2:default="false"/>
   </psk:PageMediaType>

   <psk:JobInputBin psf2:psftype="Feature">
      <psk:AutoSelect psf2:psftype="Option" psf2:default="true"/>            ~305
      <ns0000:Main psf2:psftype="Option" psf2:default="false"/> ... </ns0000:Main>
      <ns0000:Rear psf2:psftype="Option" psf2:default="false"/>... </ns0000:Rear>
   </psk:JobInputBin>

   <psk:PageOutputColor psf2:psftype="Feature">
      <psk:Color psf2:psftype="Option" psf2:default="true"/>
      <psk:Monochrome psf2:psftype="Option" psf2:default="false"/>   ~306
      <psk:GrayScale psf2:psftype="Option" psf2:default="false"/>
   </psk:PageOutputColor>
```

(1) (2)

FIG.3B 1 2

```
<psk:JobDuplexAllDocumentsContiguously psf2:psftype="Feature">
    <psk:OneSided psf2:psftype="Option" psf2:default="true"/>        ~307
    <psk:TwoSidedShortEdge psf2:psftype="Option" psf2:default="false"/>
    <psk:TwoSidedLongEdge psf2:psftype="Option" psf2:default="false"/>
</psk:JobDuplexAllDocumentsContiguously>
                                                                      308
<psf2:InvalidCombination>
    <psf2:InvalidCombinationEntry psf2:feature="psk:PageMediaType" psf2:option="psk:EnvelopePlain"/>
    <psf2:InvalidCombinationEntry psf2:feature="psk:PageBorderless" psf2:option="psk:Borderless"/>
</psf2:InvalidCombination>

...

</PrintDeviceCapabilities>
```

FIG.4A

401

```
<?xml version=“1.0” encoding=“utf-8”?>
<PrintDeviceCapabilities...>

  ...
  <psk:PageMediaSize psf2:psftype=“Feature”>                                   402
    <psk:ISOA4 psf2:psftype=“Option” psf2:default=“true”>
      <psk:MediaSizeWidth xsi:type=“xsd:integer” psf2:psftype=“ScoredProperty”>210000</psk:MediaSizeWidth>
      <psk:MediaSizeHeight xsi:type=“xsd:integer” psf2:psftype=“ScoredProperty”>297000</psk:MediaSizeHeight>
      <psk12:PortraitImageableSize...>3400,5000,203200,287000</psk12:PortraitImageableSize>
      <psk12:BorderlessImageableSize...>0,0,21000,297000</psk12:BorderlessImageableSize>
    </psk:ISOA4>
    <psk:ISOB5 psf2:psftype=“Option” psf2:default=“false”>
      <psk:MediaSizeWidth xsi:type=“xsd:integer” psf2:psftype=“ScoredProperty”>18200</psk:MediaSizeWidth>
      <psk:MediaSizeHeight xsi:type=“xsd:integer” psf2:psftype=“ScoredProperty”>25700</psk:MediaSizeHeight>
      <psk12:PortraitImageableSize ...>3400,5000,175200,247000</psk12:PortraitImageableSize>
      <psk12:BorderlessImageableSize...>0,0,182000,257000</psk12:BorderlessImageableSize>
    </psk:ISOB5>
    <psk:ISOA5 psf2:psftype=“Option” psf2:default=“false”>
      <psk:MediaSizeWidth xsi:type=“xsd:integer” psf2:psftype=“ScoredProperty”>148000</psk:MediaSizeWidth>
      <psk:MediaSizeHeight xsi:type=“xsd:integer” psf2:psftype=“ScoredProperty”>210000</psk:MediaSizeHeight>
      <psk12:PortraitImageableSize ...>3400,5000,141200,200000</psk12:PortraitImageableSize>
      <psk12:BorderlessImageableSize...>0,0,148000,210000</psk12:BorderlessImageableSize>
    </psk:ISOA5>
  </psk:PageMediaSize>

  <psk:PageBorderless psf2:psftype=“Feature”>
    <psk:None psf2:psftype=“Option” psf2:default=“true”/>   ~403
    <psk:Borderless psf2:psftype=“Option”/>
  </psk:PageBorderless>

  <psk:PageMediaType psf2:psftype=“Feature”>
    <psk:AutoSelect ... psf2:psftype=“Option” psf2:default=“true”/>
    <psk:Plain ... psf2:psftype=“Option” psf2:default=“false”/>            ~404
    <psk:Photographic ... psf2:psftype=“Option” psf2:default=“false”/>
    <psk:EnvelopePlain ... psf2:psftype=“Option” psf2:default=“false”/>
    <ns0002:PhotoPaperGlossy psf2:psftype=“Option” psf2:default=“false”/>
    <ns0002:PhotoPaperGold psf2:psftype=“Option” psf2:default=“false”/>
    <ns0002:MattePhotoPaper psf2:psftype=“Option” psf2:default=“false”/>
  </psk:PageMediaType>

  <psk:JobInputBin psf2:psftype=“Feature”>
    <psk:AutoSelect psf2:psftype=“Option” psf2:default=“true”/>            ~405
    <ns0000:Main psf2:psftype=“Option” psf2:default=“false”/> ... </ns0000:Main>
    <ns0000:Rear psf2:psftype=“Option” psf2:default=“false”/> ... </ns0000:Rear>
  </psk:JobInputBin>
```

(1) (2)

FIG.4B

①  ②

```
    <psk:PageOutputColor psf2:psftype="Feature">
        <psk:Color psf2:psftype="Option" psf2:default="true"/>                         ~406
        <psk:Monochrome psf2:psftype="Option" psf2:default="false"/>
    </psk:PageOutputColor>

    <psk:JobDuplexAllDocumentsContiguously psf2:psftype="Feature">
        <psk:OneSided psf2:psftype="Option" psf2:default="true"/>                      ~407
        <psk:TwoSidedShortEdge psf2:psftype="Option" psf2:default="false"/>
        <psk:TwoSidedLongEdge psf2:psftype="Option" psf2:default="false"/>
    </psk:JobDuplexAllDocumentsContiguously>

    <psf2:InvalidCombination>
        <psf2:InvalidCombinationEntry psf2:feature="psk:PageMediaType" psf2:option="psk:EnvelopePlain"/>     ~408
        <psf2:InvalidCombinationEntry psf2:feature="psk:PageBorderless" psf2:option="psk:Borderless"/>
    </psf2:InvalidCombination>
    <psf2:InvalidCombination>
        <psf2:InvalidCombinationEntry psf2:feature="psk:PageMediaType" psf2:option="ns0002:PhotoPaperGlossy"/>
        <psf2:InvalidCombinationEntry psf2:feature="psk:JobInputBin" psf2:option="ns0000:Main"/>
    </psf2:InvalidCombination>
    <psf2:InvalidCombination>
        <psf2:InvalidCombinationEntry psf2:feature="psk:PageMediaType" psf2:option="ns0002:PhotoPaperGlossy"/>
        <psf2:InvalidCombinationEntry psf2:feature="psk:JobDuplexAllDocumentsContiguously" psf2:option="psk:TwoSidedShortEdge"/>
    </psf2:InvalidCombination>
     ...
</PrintDeviceCapabilities>
```

FIG.8

801 printer-attributes-tag

802 document-format-supported (1setOf mineMediaType):'application/octet-stream','image/jpeg', 'image/urf','image/pwg-raster' print-color-mode-supported (1setOf keyword): 'color','monochrome','auto','auto-monochrome' ~803 sides-supported (1setOf keyword): 'one-sided','two-sided-long-edge','two-sided-short-edge' ~804 printer-firmware-name (nameWithoutLanguage): 'Inkjet-AAA' ~805
printer-firmware-version (octetString): '1.090' media-size-supported (1setOf collection):
name: media-size-supported
collection {x-dimension,y-dimension}:14800,21000 ~806
collection {x-dimension,y-dimension}:21000,29700
collection {x-dimension,y-dimension}:18200,25700 media-supported (1setOf keyword):
name: media-supported
keyword value: 'iso_a5_148x210mm' ~807
keyword value: 'iso_a4_210x297mm'
keyword value: 'jis_b5_182x257mm' media-type-supported (1setOf keyword):
name: media-type-supported ~808
keyword value: 'platinum'
keyword value: 'gold'
keyword value: 'mat'
keyword value: 'envelope'
keyword value: 'stationery'
keyword value: 'photographic'
keyword value: 'auto' media-source-supported (1setOf keyword): 'auto','main','rear' ~809 media-top-margin-supported (1setOf integer): 500,0,800,600
media-left-margin-supported (1setOf integer): 340,0,640,560,600,500 ~810
media-right-margin-supported (1setOf integer): 340,0,630,560,600,500
media-bottom-margin-supported (1setOf integer): 500,0,1270,600

FIG.9

901 name: media-col-database collection
memberAttrName: media-size
collection {x-dimension,y-dimension} ~902
memberAttrName: x-dimension
integer value: 14800
memberAttrName: y-dimension
integer value: 21000
memberAttrName: media-bottom-margin
integer value: 500
memberAttrName: media-left-margin
integer value: 340
memberAttrName: media-right-margin
integer value: 340
memberAttrName: media-top-margin
integer value: 500
memberAttrName: media-source
keyword value: ‘auto’
memberAttrName: media-type
keyword value: ‘stationery’ collection
memberAttrName: media-size
collection {x-dimension,y-dimension}
memberAttrName: x-dimension ~903
integer value: 14800
memberAttrName: y-dimension
integer value: 21000
memberAttrName: media-bottom-margin
integer value: 500
memberAttrName: media-left-margin
integer value: 340
memberAttrName: media-right-margin
integer value: 340
memberAttrName: media-top-margin
integer value: 500
memberAttrName: media-source
keyword value: ‘auto’
memberAttrName: media-type
keyword value: ‘photographic’

FIG.10

1001

| QueueName | DataName | Data |
|---|---|---|
| QUEUE (1) | DEVICE TYPE | INKJET |
| | SIZE | A5 |
| | | A4 |
| | | B5 |
| | | ... |
| | MEDIUM | PLAIN PAPER |
| | | PHOTO PAPER |
| | | ENVELOPE |
| | | GLOSSY PRO PLATINUM |
| | | GLOSSY GOLD |
| | | MATTE PHOTO PAPER |
| | | ... |
| | SHEET FEEDING TRAY | AUTOMATIC SELECTION |
| | | MAIN TRAY |
| | | REAR TRAY |
| | CONSTRAINT 1 | MEDIUM: PHOTO PAPER |
| | | SHEET FEEDING TRAY: MAIN TRAY |
| | CONSTRAINT 2 | MEDIUM: PHOTO PAPER |
| | | DOUBLE-SIDED: ON |
| | ... | ... |
| | | ... |
| QUEUE (2) | DEVICE TYPE | LASER BEAM |
| | SIZE | A4 |
| | | A5 |
| | | LETTER |
| | ... | ... |
| ... | ... | ... |

FIG.11

1101

| QueueName | DataName | Data |
|---|---|---|
| QUEUE (1) | DEVICE TYPE | INKJET |
| | SIZE | A5 |
| | | A4 |
| | | B5 |
| | MEDIUM | PLAIN PAPER |
| | | PHOTO PAPER |
| | | ENVELOPE |
| | | GLOSSY PRO PLATINUM |
| | | GLOSSY GOLD |
| | | MATTE PHOTO PAPER |
| | SHEET FEEDING TRAY | AUTOMATIC SELECTION |
| | | MAIN TRAY |
| | | REAR TRAY |
| | CONSTRAINT 1 | MEDIUM: PHOTO PAPER |
| | | DOUBLE-SIDED: SHORT-EDGE BINDING |
| | CONSTRAINT 2 | MEDIUM: PHOTO PAPER |
| | | DOUBLE-SIDED: LONG-EDGE BINDING |
| | CONSTRAINT 3 | MEDIUM: ENVELOPE |
| | | DOUBLE-SIDED: SHORT-EDGE BINDING |
| | CONSTRAINT 4 | MEDIUM: ENVELOPE |
| | | DOUBLE-SIDED: LONG-EDGE BINDING |
| | CONSTRAINT 5 | MEDIUM: GLOSSY PRO PLATINUM |
| | | DOUBLE-SIDED: SHORT-EDGE BINDING |
| | CONSTRAINT 6 | MEDIUM: GLOSSY PRO PLATINUM |
| | | DOUBLE-SIDED: LONG-EDGE BINDING |
| | CONSTRAINT 7 | MEDIUM: GLOSSY GOLD |
| | | DOUBLE-SIDED: SHORT-EDGE BINDING |
| | CONSTRAINT 8 | MEDIUM: GLOSSY GOLD |
| | | DOUBLE-SIDED: LONG-EDGE BINDING |
| | CONSTRAINT 9 | MEDIUM: MATTE PHOTO PAPER |
| | | DOUBLE-SIDED: SHORT-EDGE BINDING |
| | CONSTRAINT 10 | MEDIUM: MATTE PHOTO PAPER |
| | | DOUBLE-SIDED: LONG-EDGE BINDING |
| | CONSTRAINT 11 | BORDERLESS: ON |
| | | DOUBLE-SIDED: SHORT-EDGE BINDING |
| | CONSTRAINT 12 | BORDERLESS: ON |
| | | DOUBLE-SIDED: LONG-EDGE BINDING |

INFORMATION PROCESSING APPARATUS, CONTROL METHOD, AND STORAGE MEDIUM

BACKGROUND

Field

The present disclosure relates to an information processing apparatus, a control method, and a storage medium.

Description of the Related Art

The following configuration is known as software for controlling a printing device. That is, the software issues a print instruction to a printing device connected to a host computer by using a printer driver installed on the host computer. An operating system (OS) that is basic software is installed on the host computer. The printer driver is configured according to specifications defined by the OS, and operates when called by the OS. Vendors that provide printing devices can provide means for issuing a print instruction to each printing device using the OS by providing printer drivers conforming to the OS specifications.

Windows® has recently provided a standard class driver (hereinafter also referred to as a “standard driver”) that can be used in common among printing devices provided by a plurality of vendors. Such a standard driver is included in an OS package and can be used by connecting a printing device that supports the standard driver to a host computer. The use of the standard driver eliminates the need for installing another model-specific printer driver for the connected printing device. The standard driver is configured to designate print functions depending on Print Device Capabilities (hereinafter abbreviated as “PDC”) generated based on information obtained from the connected printing device. This configuration enables a user that uses the standard driver to designate print functions depending on the capabilities of the connected printing device by using only one standard driver.

The standard driver can be associated with an application for function extension (hereinafter also referred to as an “extension application”). The extension application can be provided by a vendor that provides the printing device. The extension application can provide functions (extended functions) that cannot be implemented only by the standard driver by editing the PDC generated by the standard driver. Japanese Patent Application Laid-Open No. 2021-108001 discusses a technique for extending functions of the standard driver by editing the PDC based on information obtained from a printer using the extension application.

The extension application discussed in Japanese Patent Application Laid-Open No. 2021-108001 can extend functions of the standard driver by editing the PDC based on information obtained from a printer. However, it can be considered that the extension application may fail to successfully obtain information from the printer in some cases.

SUMMARY

According to an aspect of the present disclosure, a non-transitory storage medium stores an application that displays a print setting screen, wherein the application, when executed, causes an information processing apparatus to implement a control method includes obtaining first attribute information and second attribute information from a printing device, storing, in a storage unit, first information based on the obtained first attribute information and second information based on the obtained second attribute information, and controlling the print setting screen to be displayed based on the first information and the second information stored in the storage unit, wherein in a case where the second attribute information is not successfully obtained, information stored in the application in advance is stored as the second information in the storage unit.

Further features of the present disclosure will become apparent from the following description of exemplary embodiments with reference to the attached drawings.

BRIEF DESCRIPTION OF THE DRAWINGS

FIGS. 3A and 3B illustrate an example of Print Device Capabilities (PDC) generated by print data generation software.

FIGS. 4A and 4B illustrates an example of PDC edited by a print function extension unit.

FIG. 8 illustrates an example of information to be returned from the printing device.

FIG. 9 illustrates an example of information (media-col-database) to be returned from the printing device.

FIG. 10 illustrates an example of a data structure of information stored by the capability information obtaining unit.

FIG. 11 illustrates an example of stored information when constraint information common to models is used.

DESCRIPTION OF THE EMBODIMENTS

Figure 1:
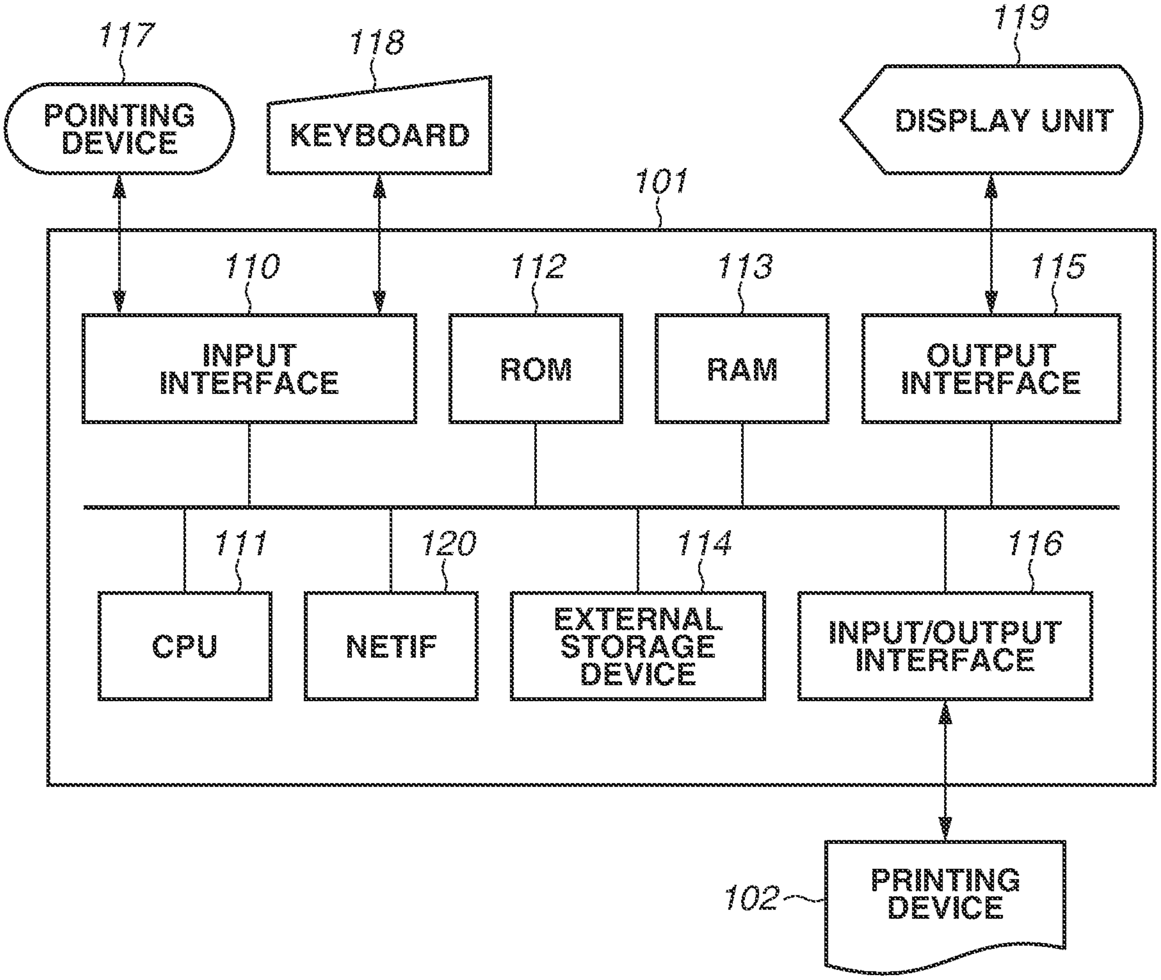
FIG. 1 is a block diagram illustrating a hardware configuration example of a printing system.

Exemplary embodiments of the present disclosure will be described in detail below with reference to the accompanying drawings. The following exemplary embodiments are not intended to limit the scope of the disclosure, and not all combinations of features described in the exemplary embodiments are necessarily deemed to be essential to solve the issue of the present disclosure.

The same components are denoted by the same reference numerals, and redundant descriptions thereof are omitted.

<Hardware Configuration of Printing System>

FIG. 1 is a block diagram illustrating an example of a hardware configuration of a printing system. In the configuration example illustrated in FIG. 1, a host computer 101 is an example of an information processing apparatus and includes an input interface 110, a central processing unit (CPU) 111, a read-only memory (ROM) 112, a random access memory (RAM) 113, an external storage device 114, an output interface 115, and an input/output interface 116. The input interface 110 is connected to input devices such as a keyboard 118 and a pointing device 117. The output interface 115 is connected to a display device such as a display unit 119. A NETIF 120 is a network interface and performs control processing for data transfer to an external device via a network.

The ROM 112 stores an initialization program. The external storage device 114 stores an application program group, an operating system (OS), print data generation software, and various other data. The RAM 113 is used as a working memory or the like in the case of executing various programs stored in the external storage device 114, and various programs are operable in the host computer 101.

In a first exemplary embodiment of the present disclosure, the CPU 111 executes functions to be described below in the host computer 101 and processing associated with flowcharts to be described below by performing processing according to the steps of a program stored in the ROM 112. A printing device 102 is connected to the host computer 101 via the input/output interface 116. An inkjet printer configured to perform printing by ejecting ink onto a sheet is described as an example of the printing device 102. However, printing may be executed by another method (e.g., an electrophotographic method). The host computer 101 may be a desktop personal computer, a smartphone, or a laptop computer.

In the first exemplary embodiment, two types of printers, i.e., an inkjet printer that supports a local connection and a laser beam printer that supports a local connection and a cloud connection, are described as examples of the type of the printing device 102. The local connection indicates a connection configuration in which the host computer 101 and the printing device 102 are connected such that the host computer 101 and the printing device 102 can directly communicate with each other via the input/output interface 116 and the NETIF 120. The cloud connection indicates a connection configuration in which the host computer 101 issues a print instruction to the printing device 102 via a cloud print service (not illustrated) on the Internet via the NETIF 120. Specific examples of features and options, such as print function information or Print Device Capabilities (PDC) 203, information 801, and information 901, which are described below, are associated with the printing device whose device type is an inkjet printer. In the figures and tables to be described below, unless otherwise specified, specific examples of features and options are associated with the printing device whose device type is an inkjet printer. While, in the first exemplary embodiment, the description is given of an example where two device types described above are used, the device type is not limited to the two types described above. A configuration may be employed in which a plurality of device types and a plurality of connection configurations can be discriminated from each other.

<Configuration of Printing System Based on Software>

Figure 2A:
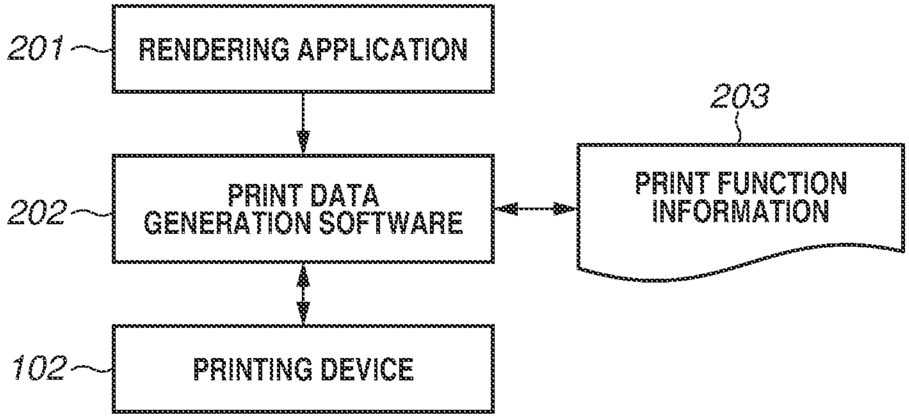
FIGS. 2A and 2B are block diagrams each illustrating a software configuration example of the printing system.
Figure 2B:
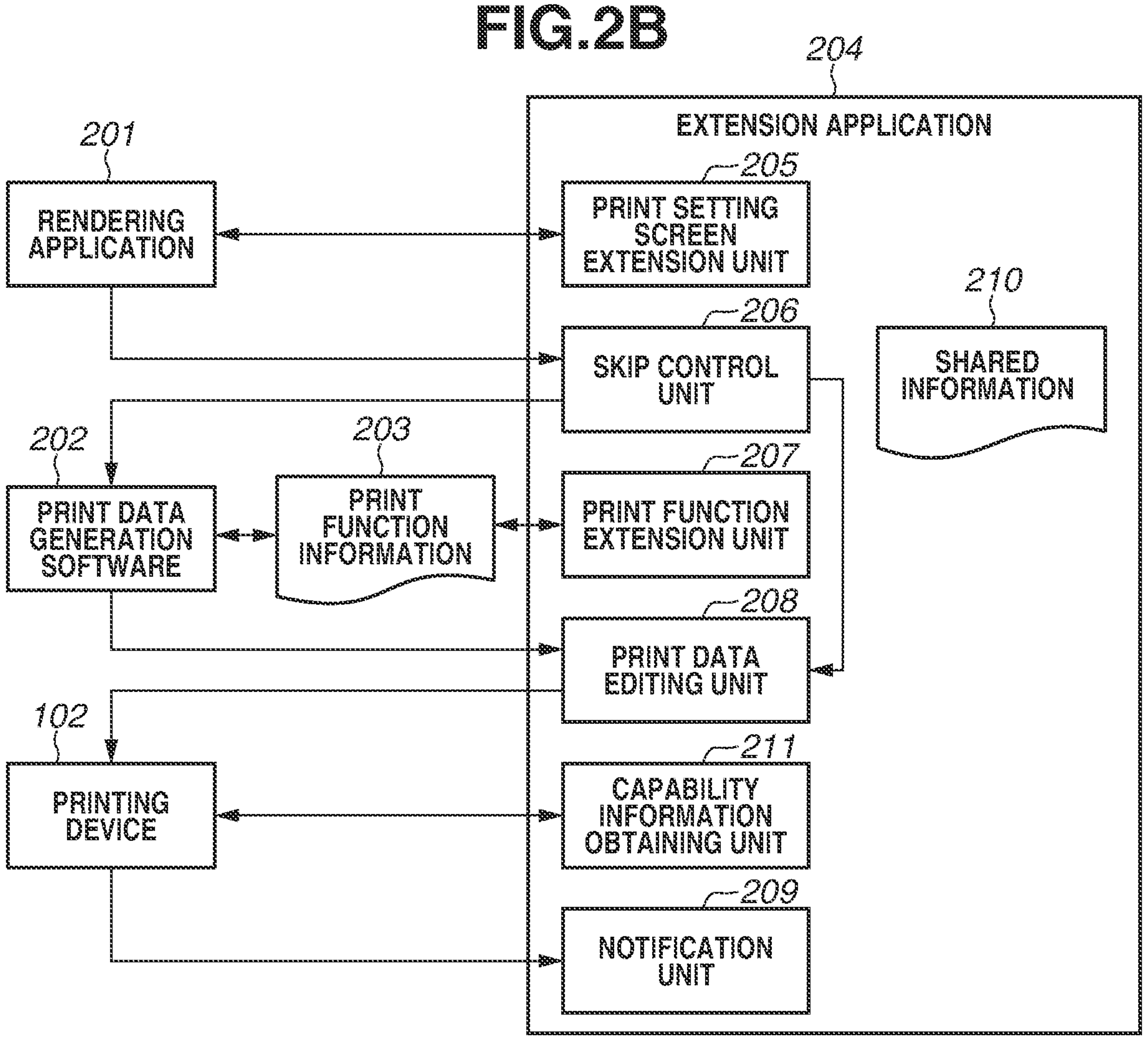

FIGS. 2A and 2B are block diagrams each schematically illustrating a software configuration example of the printing system. The description will be given assuming that the printing system uses the host computer 101 incorporating Microsoft® Windows® 11 as the OS. FIG. 2A illustrates a typical configuration example in a case where an extension application 204 is not associated with the printing device 102 and print data generation software 202. The print data generation software 202 is software included in an OS package to be distributed. The print data generation software 202 generates print data based on the definition of Internet printing Protocol (IPP) as a standard protocol for printing, and transmits the generated print data to the printing device 102. Any printing device can execute printing based on the print data generated by the print data generation software 202 as long as the printing device can interpret the print data generated by the print data generation software 202, regardless of the vendor (manufacturer) that designs the printing device.

A rendering application 201 is software for creating content to be printed (rendering data). For example, the rendering application 201 corresponds to a document creation application or a table calculation application. Upon receiving a print request from a user, the rendering application 201 issues a print instruction to the OS. The print instruction includes print setting information for instructing operations of the print data generation software 202 and the printing device 102. The print setting information is also referred to as Print Ticket (hereinafter abbreviated as "PT").

The rendering application 201 is configured to display a print setting screen provided by any one of the print data generation software 202, the OS, and the rendering application 201 to output the print setting information. The print setting screen includes setting items (hereinafter also referred to as "control items") indicating print functions that can be set based on capability information (information that can be set as print settings) obtained from the print data generation software 202, and control items indicating setting values for the setting items. The capability information is also referred to as Print Capabilities (hereinafter abbreviated as "PC"). The print data generation software 202 determines the PC based on print function information 203. The print function information 203 is data indicating all settable print functions, setting values for the settable print functions, and print functions in which an exclusive relationship between the setting values is described. The print function information 203 is also referred to as Print Device Capabilities (PDC). The PDC 203 is dynamically generated by the print data generation software 202. Specifically, the print data generation software 202 or the OS obtains attribute data on the printing device 102 from the printing device 102, and generates the PDC 203 based on attribute information in the obtained attribute data. The generated PDC 203 is editable.

The attribute data on the printing device 102 obtained from the printing device 102 is a response obtained by issuing a Get-Printer-Attributes operation of the IPP to the printing device 102. The response includes attribute information indicating functions that can be designated in the printing device 102 (printing device capabilities), and setting values associated with the attribute information. This response is stored in the RAM 113.

The print data generation software 202 generates the PDC 203 for each printing device, and manages attribute information that can be used for each printing device and setting values associated with the attribute information. The print setting screen is displayed according to the PC generated based on the PDC 203.

With the configuration described above, the print data generation software 202 can be configured to enable the user to designate print functions that can be used in the connected printing device 102. In other words, even when printing devices having different functions are connected, or printing devices developed by different vendors are connected, the print data generation software 202 can be configured to enable the user to designate print functions that can be used depending on the connected printing device. A configuration using an IPP Class Driver, which is incorporated in Windows® 11, will now be described as the print data generation software 202. The IPP Class Driver is a printer driver for executing print processing according to the specifications of the standard print protocol called IPP and is included in the OS package. The IPP Class Driver is not a model-specific printer driver depending on the model of the printing device 102, but is a standard class driver that can be used in common among a plurality of printing devices. The IPP Class Driver obtains capability information about the connected printing device 102 so that the user can designate print functions supported by the connected printing device 102, and generates the PDC 203 based on the capability information.

The OS generates intermediate data (also referred to as input data) based on a print instruction output from the rendering application 201, and delivers the generated intermediate data to the print data generation software 202. The rendering application 201 outputs Graphic Device Interface (GDI) format data or Extensible Markup Language (XML) Paper Specification (XPS) format data as data for printing. If GDI format data is output from the rendering application 201, the OS convers the GDI format data output from the rendering application 201 into XPS format data. Then, the converted XPS format data is delivered as intermediate data to the print data generation software 202. If XPS format data is output from the rendering application 201, the OS delivers the XPS format data as intermediate data to the print data generation software 202. The intermediate data includes rendering data as information about a picture to be formed on a sheet, and print setting information set by the user.

The print data generation software 202 converts the obtained intermediate data into print data that can be interpreted by the printing device 102, and transmits the print data to the printing device 102. The print data includes rendering data as information about a picture to be formed on a sheet, and print setting attribute information (attribute information for designating print settings) generated based on the print setting information set by the user. The print setting attribute information includes attribute information indicating functions that can be designated in the printing device 102 (printing device capabilities), and setting values associated with the attribute information. In printing using the IPP Class Driver, portable document format (PDF) data or Printer Working Group-Raster (PWG-Raster) data is used as the rendering data. The print setting attribute information includes attributes (features) defined in the IPP and values (options) for the attributes.

The printing device 102 performs printing on a sheet based on the print data transmitted from the print data generation software 202. In this case, the printing device 102 forms the rendering data included in the print data on a sheet by operating based on the print setting attribute information included in the print data. The print setting attribute information includes attribute information for designating print qualities (image quality priority, speed priority, etc.), two-sided printing, and the like, and a setting value for the attribute information. For example, if the print setting attribute information includes attribute information for designating two-sided printing and a setting value indicating that two-sided printing is implemented, the printing device 102 executes two-sided printing.

FIG. 2B is a block diagram illustrating a software configuration example in a case where the extension application 204 is associated with the print data generation software 202. Components and processing other than those described below are similar to those in the configuration illustrated in FIG. 2A.

The extension application 204 is software for extending the functions of the print data generation software 202 and is not included (not packaged) in the OS. Accordingly, the user needs to operate the host computer 101 to download and install the extension application 204 from a server via the Internet. Alternatively, the extension application 204 may be automatically installed upon connection of the printing device 102 to the host computer 101. Specifically, when the printing device 102 is connected to the host computer 101, the OS obtains device identification information from the printing device 102. The device identification information is, for example, a hardware identification (HWID) of the printing device 102. The OS downloads and installs the extension application 204 corresponding to the obtained device identification information from the server via the Internet. In other words, the print data generation software 202 and the extension application 204 are held as different files in the host computer 101. The extension application 204 is, for example, an application provided by the vendor of the printing device 102.

The print data generation software 202 and the extension application 204 may be updated and upgraded in version. The update processing for the print data generation software 202 and the update processing for the extension application 204 are performed at respective different timings. In other words, a timing when the print data generation software 202 is obtained by the host computer 101 is different from a timing when the extension application 204 is obtained. A trigger by which the print data generation software 202 is obtained by the host computer 101 is also different from a trigger by which the extension application 204 is obtained. When the extension application 204 is installed, the OS associates the extension application 204 with each of the print data generation software 202 and the printing device 102.

The extension application 204 described in the present exemplary embodiment includes a print setting screen extension unit 205, a skip control unit 206, a print function extension unit 207, a print data editing unit 208, a notification unit 209, and a capability information obtaining unit 211. The extension application 204 also includes shared information 210 that is accessible from these units in common. The shared information 210 is actually a file stored in the external storage device 114, or information stored in the RAM 113. The extension application 204 is configured to write and read information to and from the shared information 210 using an application program interface (API) provided by the OS.

The operation of the extension application 204 may be terminated every time the processing of each unit ends. In this case, the OS starts the extension application 204 every time the OS receives a request to use any one of the units from the rendering application 201, the print data generation software 202, or the printing device 102. Any other configuration can also be used. For example, instead of the configuration in which the OS terminates the operation of the extension application 204 when the processing of the print setting screen extension unit 205 ends, the OS may maintain the extension application 204 in the activated state even after the processing of the skip control unit 206 ends.

Further, the extension application 204 may be designed to cancel processing during the processing of each unit. For example, assume a case where an error has occurred during transmission of print data to the printing device 102. In this case, the printing device 102 issues a notification to the extension application 204, and the extension application 204 causes the host computer 101 to display an error notification and a print cancel button using the notification unit 209. When the user selects the print cancel button, the extension application 204 cancels the processing being executed by the corresponding unit. If printing is cancelled, a job being processed on a print queue is deleted by the OS.

Upon receiving a print request from the user, the rendering application 201 issues a print instruction to the OS. Also, in this configuration, the rendering application 201 is configured to display a print setting screen, like in the configuration illustrated in FIG. 2A. When a predetermined user operation is performed on the print setting screen provided by the rendering application 201, a print setting screen provided by the extension application 204 can be displayed. Specifically, the print setting screen provided by the print setting screen extension unit 205 included in the extension application 204 is displayed. The print setting screen extension unit 205 executes processing for display control. Whether to display the print setting screen provided by the print setting screen extension unit 205 depends on a user operation. The print setting screen extension unit 205 will be described in detail below with reference to FIGS. 5A to 5C.

When the rendering application 201 receives a print request from the user and issues a print request to the OS, the OS starts the skip control unit 206. The skip control unit 206 performs control processing to determine whether to skip the processing of the print data generation software 202. The processing of the print data generation software 202 is processing in which the print data generation software 202 converts intermediate data generated by the OS into print data. Skipping the processing indicates processing of setting a flag indicating that the print data generation software 202 delivers the intermediate data directly to the extension application 204, without converting the intermediate data.

After the skip control processing is performed by the skip control unit 206, the OS generates intermediate data based on the print instruction output from the rendering application 201. The generated intermediate data is delivered to the print data generation software 202. In this case, if the skip control processing is not performed by the skip control unit 206, the print data generation software 202 processes the intermediate data into print data that can be interpreted by the printing device 102, and delivers the print data to the print data editing unit 208. On the other hand, if the skip processing is performed by the print data generation software 202, the intermediate data is delivered to the print data editing unit 208 without being processed by the print data generation software 202. This allows the intermediate data to be processed in the print data editing unit 208.

The print data editing unit 208 edits the intermediate data delivered from the print data generation software 202 or the print data processed by the print data generation software 202. As editing content, for example, in layout printing, the print data editing unit 208 changes the layout of the intermediate data or the print data based on print setting information about layout printing received from the OS. Further, the print data editing unit 208 can display a user interface (UI) screen on the display unit 119, and can provide a function for, for example, displaying the layout result of the intermediate data or the print data as a preview screen. In a state where the UI screen displayed by the print data editing unit 208 on the display unit 119 is opened, the print data is not transmitted to the printing device 102, and when the UI screen is closed, processing for transmitting the print data is activated.

After the print data editing unit 208 has edited the print data, the print data is delivered to the printing device 102. The printing device 102 performs printing on a sheet based on the received print data.

If the processing of the print data generation software 202 is skipped by the skip control unit 206, the print data editing unit 208 may convert the received intermediate data into print data that can be interpreted by the printing device 102. Further, when the print data editing unit 208 converts the intermediate data into print data, the print data editing unit 208 may use a function provided by the OS to convert the intermediate data into print data.

The extension application 204 includes the print function extension unit 207. The print function extension unit 207 is configured to edit the PDC 203 generated by the print data generation software 202. The PDC 203 to be edited by the print function extension unit 207 will be described in detail below with reference to FIGS. 3A, 3B, 4A, 4B, 8, and 9. This configuration enables the print function extension unit 207 to, for example, add functions provided by the extension application 204, or add an exclusive relationship between setting values for the print functions. Additionally, the print function extension unit 207 can add information about functions that cannot be added to the PDC by the print data generation software 202 to the PDC.

When the extension application 204 is first associated with the printing device 102 and the print data generation software 202, the OS starts the print function extension unit 207. Further, the OS may start the print function extension unit 207 at any other timing, for example, when the OS is started. With this configuration, even in a case where an option (e.g., a finisher or the like) is added to the printing device 102 later and a function associated with printing is extended, the print function extension unit 207 can detect an extension function and add the extension function to the PDC 203.

The extension application 204 also includes the notification unit 209. The notification unit 209 is configured to display a notification for the user upon occurrence of an error in the printing device 102. For example, if a paper empty error occurs in the printing device 102, the print data generation software 202 detects the error and causes the display unit 119 to display a message using a notification function called a toast notification, which is a function of the OS. When the user clicks the toast notification, the notification unit 209 in the extension application 204 is called by the OS and a UI screen of the notification unit 209 is displayed. The UI screen of the notification unit 209 is configured to display, for example, a detailed message about a paper empty error and a paper loading procedure.

The configuration of the extension application 204 to implement the present exemplary embodiment is not limited to the configuration including all functions (units) described above, but instead may include some of the functions, or may include any other functions. The extension application 204 is also simply referred to as print software.

<Example of Editing PDC by Print Function Extension Unit>

First, the print data generation software 202 obtains capability information about the printing device 102 connected to the host computer 101, and generates the PDC 203 based on the capability information. The capability information obtained from the printing device 102 is information including information that can be set as print settings by the user when printing is performed in the printing device 102. The OS requests the print function extension unit 207 in the extension application 204 to edit the PDC 203, for example, at a timing when a print queue and the extension application 204 are associated with each other. The OS sends a request for editing the PDC 203 not only at the timing when the extension application 204 and the print queue are associated with each other, but also at a timing when the print setting screen extension unit 205 has opened the print setting screen. Upon receiving the PDC editing request from the OS, the print function extension unit 207 obtains the PDC 203 generated by the print data generation software 202 and starts PDC edit processing.

The PDC 203 generated by the print data generation software 202 will be described in detail. FIGS. 8 and 9 each illustrate an example of the response corresponding to the Get-Printer-Attributes operation of the IPP issued to the printing device 102. The print data generation software 202 receives the responses illustrated in FIGS. 8 and 9.

The information 801 illustrated in FIG. 8 is an example of the response that can be obtained by issuing the Get-Printer-Attributes operation of the IPP to the printing device 102. The information 801 includes attribute information indicating functions (features) that can be designated in the printing device 102, and setting values (options) associated with the attribute information. As illustrated in the information 801, information about functions (features), such as "size" and "medium", and setting values (options) that can be set for the functions can be obtained from the printing device 102. In information 802, "document-format-supported" indicates a print data format that can be accepted by the printing device 102. The information 802 indicates that the printing device 102 supports data formats of "application/octet-stream", "image/jpeg", "image/urf", and "image/pwg-raster". In information 803, "print-color-mode-supported" indicates a color mode that can be designated when printing is performed in the printing device 102. The information 803 indicates that the printing device 102 supports color modes: "color", "monochrome", and "auto" (automatic selection). In information 804, "sides-supported" indicates that the printing device 102 supports two types of two-sided printing, i.e., two-sided-short-edge (short-edge binding) and two-sided-long-edge (long-edge binding). In information 805, "printer-firmware-name" and "printer-firmware-version" indicate the name of firmware of the main body of the printing device 102 and the version information thereof, respectively. The information 805 indicates that the name of the firmware is "inkjet-AAA" and the version information is "1.090". In information 806, "media-size-supported" indicates that the media sizes supported by the printing device 102 are indicated by information representing a width and a height in units of 1/100mm. An example of the information 806 indicates that the printing device 102 supports printing on sheets of A5, A4, and B5 sizes. In information 807, "media-supported" indicates the names of media sizes supported by the printing device 102. In information 808, "media-type-supported" indicates media types supported by the printing device 102. The information 808 indicates sheet types supported by the printing device 102. The printing device 102 supports platinum (Glossy Platinum), gold (Glossy Gold), mat (matte photo paper), stationary (plain paper), photographic (photo paper), and envelope (envelope sheet). In information 809, "media-source-supported" indicates a list of sheet feeding trays supported by the printing device 102. The information 809 indicates that the printing device 102 supports auto (automatic selection), main (main tray), and rear (rear tray) as sheet feeding trays for print sheets. In information 810, "media-top (bottom/right/left)-margin-supported" indicates lengths of margins that can be set at the top, bottom, left, and right of a sheet when printing is performed in the printing device 102. An example of the information 810 indicates that margins of 5 mm, 0 mm, 8 mm, and 6 mm can be set at the top of a sheet, margins of 3.4 mm, 0 mm, 6.4 mm, 5.6 mm, 6 mm, and 5 mm can be set at the left side of a sheet, margins of 3.4 mm, 0 mm, 6.3 mm, 5.6 mm, 6 mm, and 5 mm can be set at the right side of a sheet, and margins of 5 mm, 0 mm, 12.7 mm, and 6 mm can be set at the bottom of a sheet. Margins that can be set depending on the size and the medium type of each sheet are described in an information set called "media-col-database" as described below. Attribute values illustrated for each of the pieces of information 802 to 810 are merely examples. In practice, attribute values other than the illustrated attribute values are also included. The attribute information indicated by the information 801 is also merely an example. The response obtained by issuing the Get-Printer-Attributes operation of the IPP also includes attribute information other than the illustrated attribute information.

FIG. 9 illustrates an example of information about media-col-database attribute values in the response obtained by issuing the Get-Printer-Attributes operation of the IPP to the printing device 102. The media-col-database attribute values include a list of combinations of option values that can be set as print settings in the printing device 102. In information 902, "collection" indicates one combination of option values. An example of the information 902 indicates that printing can be performed with settings of sheet size "A4", top, bottom, left, and right margins of 5 mm, 5 mm, 3.4 mm, and 3.4 mm, respectively, sheet feeding tray "automatic selection", and medium "plain paper". Like the information 902, information 903 is also an example of a combination of option values included in the list of combinations of option values that can be set as print settings for the printing device 102. The information 901 is merely an example of information included in media-col-database. In practice, combinations of all settable options for the printing device 102 are included for each of four features of "sheet size", "margin", "sheet feeding tray", and "medium". The print data generation software 202 issues the Get-Printer-Attributes operation of the IPP to the printing device 102, and obtains information such as the information 801 and the information 901. The print data generation software 202 generates the PDC 203 based on the obtained information.

An example of the PDC 203 generated by the print data generation software 202 will be described with reference to information 301 illustrated in FIGS. 3A and 3B. The PDC 203 is described in the XML format, like the information 301 illustrated in FIGS. 3A and 3B. Attribute information indicating functions (features) that can be designated in the printing device 102 and setting values (options) associated with the attribute information are described in the PDC 203. Information 302 indicates that International Standardization Organization (ISO) A4, ISO A5, and ISO B5 can be designated as PageMediaSize (sheet size). In this case, PageMediaSize indicates a function (feature), and ISO A4 and the like indicate setting values (options) for the function. Also, as for functions to be described below, functions (features) and setting values (options) are described in the equivalent manner. Information 303 indicates that Borderless (borderless printing) and None (printing with a border) can be set as PageBorderless (borderless printing setting). Information 304 indicates that Plain (plain paper), Photographic (photo paper), and EnvelopePlain (envelope sheet) can be designated as PageMediaType (medium). Information 305 indicates that Main (main tray) and Rear (rear tray) can be designated as JobInputBin (sheet feeding tray). Information 306 indicates that Color, Monochrome, and GrayScale can be designated as PageOutputColor (color mode during printing). Information 307 indicates options that can be set in JobDuplexAllDocumentsContiguously (two-sided printing setting). In this case, OneSided (one-sided printing), TwoSideShortEdge (short-edge binding), and TwoSidedLongEdge (long-edge binding) can be designated.

Information 308 is information called InvalidCombination and is constraint information (conflict information) for causing the OS to perform control processing to prohibit printing in which two designated items are simultaneously set. InvalidCombination is generated based on media-col-database illustrated in FIG. 9. The media-col-database indicates setting values that can be combined, and combinations that are not defined in the media-col-database are indicated as InvalidCombination. The information 308 in the PDC 203 indicates that printing with EnvelopePlain (envelope sheet) designated as a medium and Borderless designated as a borderless printing setting is prohibited. Assume that the user simultaneously sets two items designated as InvalidCombination in the information 308 and issues a print instruction using the print data generation software 202. The OS executes Validate Print Ticket processing, and forcibly changes one or both of setting values corresponding to InvalidCombination. In an example of the information 308, when the user sets "envelope sheet" as a medium, turns on "borderless printing", and issues a printing execution instruction, the OS turns off the borderless printing setting, or changes the media setting to a medium on which borderless printing can be performed. The information described in the information 301 is merely an example. In practice, any other features, options, and conflict information can be described.

As described above, the print data generation software 202 or the OS issues the Get-Printer-Attributes operation to the printing device 102, thereby obtaining information such as the information 801 and information 901 described above. Further, the print data generation software 202 or the OS generates the PDC 203 based on the obtained information.

Only features and options that are known by the OS are described in the PDC 203 generated in this case. Specifically, information unique to the vendor, such as medium: Glossy Pro Platinum or matte photo paper, as indicated by the information 808, is not described in the PDC 203. In the constraint information (InvalidCombination) described in the PDC 203, the constraint information in which only a part of the media-col-database information obtained from the printing device 102 is reflected is described. Thus, only the standard or general-purpose features and options in the information 801 and information 901 obtained from the printing device 102 are described in the PDC 203 generated by the print data generation software 202 or the OS.

The print function extension unit 207 in the extension application 204 edits the PDC 203 generated by the print data generation software 202 or the OS, and extends functions that can be used by the user when printing is performed in the printing device 102 using the print data generation software 202.

Specifically, the print function extension unit 207 describes new features and options, or new InvalidCombination in the PDC 203.

For example, adding features and options makes it possible to add functions provided by the extension application 204 and to add functions that are supported by the printing device 102 and are not supported by the print data generation software 202. Further, adding InvalidCombination makes it possible to, for example, add an exclusive relationship (constraint information) between setting values for print functions. In the present exemplary embodiment, the capability information obtaining unit 211 in the extension application 204 issues the Get-Printer-Attributes operation of the IPP to the printing device 102, thereby obtaining capability information such as the information 801 and the information 901. Further, the print function extension unit 207 edits the PDC 203 based on the obtained capability information such as the information 801 and the information 901. The capability information obtaining unit 211 executes storage control processing for writing information into the shared information 210. In the present exemplary embodiment, an example where the capability information obtaining unit 211 obtains capability information from the printing device 102 is described. The print data generation software 202 may transmit print data to the printing device 102 via a cloud print service. The cloud print service obtains and stores capability information from the printing device 102 in advance. The capability information obtaining unit 211 transmits the Get-Printer—Attributes operation to the cloud print service. The capability information obtaining unit 211 receives the capability information about the printing device 102 from the cloud print service.

An example of the PDC 203 edited by the print function extension unit 207 will be described with reference to information 401 illustrated in FIGS. 4A and 4B. An example where the print function extension unit 207 performs edit processing on the PDC 203 by adding media, deleting unwanted color mode settings, and adding constraint information will be described. Specifically, the information 401 is obtained after the print function extension unit 207 adds or deletes options to or from the information 304, 306, and 308 illustrated in FIGS. 3A and 3B. Attributes indicated by pieces of information 402 to 408 are similar to those indicated by the pieces of information 302 to 308, and thus descriptions thereof are omitted.

The information 404 indicates that the print function extension unit 207 has added media unique to the vendor. Specifically, PhotoPaperGlossy (Glossy Pro Platinum), PhotoPaperGold (Glossy Pro Gold), and MattePhotoPaper (matte photo paper) are added as PageMediatype.

In the information 406, the print function extension unit 207 deletes GrayScale from PageOutputColor. This is because GrayScale is an option that has the same properties as those of Monochrome. If GrayScale is not deleted, grayscale is displayed as an option for the color mode when the rendering application 201, the OS, or the print setting screen extension unit 205 displays the print setting screen. Display of both "grayscale" and "monochrome", which have the same properties, may confuse the user. For this reason, the above-described processing is performed.

In the information 408, the print function extension unit 207 adds two pieces of constraint information to InvalidCombination. A first combination is a combination of "medium: Glossy Pro Platinum" and "sheet feeding tray: main tray". A second combination is a combination of "medium: Glossy Pro Platinum" and "two-sided printing: short-edge binding".

Thus, the print function extension unit 207 edits the PDC 203 based on the information obtained by the capability information obtaining unit 211 from the printing device 102. This edit processing makes it possible to add functions provided by the extension application 204 and to add functions that are supported by the printing device 102 and are not supported by the print data generation software 202. The use of the extension application 204 makes it possible to add an exclusive relationship (constraint information) between setting values for print functions. In the present exemplary embodiment, addition of functions and addition of an exclusive relationship (constraint information) between setting values for print functions are described as an example of PDC edit processing performed by the print function extension unit 207. The above-described processing is merely an example. In practice, any other functions may be added and any other exclusive relationships (constraint information) between setting values for print functions may be added.

<Examples of Screen to be Displayed by Print Setting Screen Extension Unit>

Figure 5A:
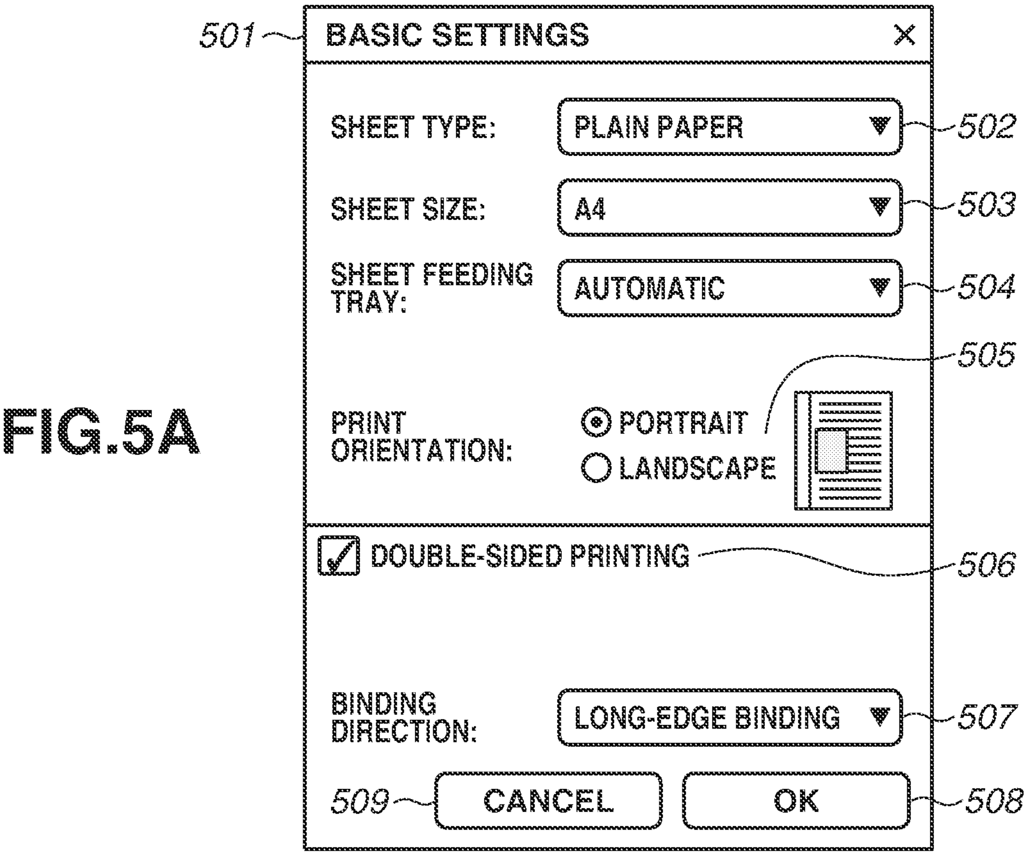
FIGS. 5A to 5C each illustrate an example of a print setting screen to be displayed by a print setting screen extension unit.

Next, examples of the print setting screen to be displayed by the print setting screen extension unit 205 will be described with reference to FIGS. 5A to 5C. PC is generated based on the PDC 203 edited by the print function extension unit 207. A print setting screen 501 illustrated in FIG. 5A is an example of the screen to be displayed by the print setting screen extension unit 205 based on the generated PC. The print setting screen extension unit 205 is called by the OS when the user issues a print setting screen display instruction on the rendering application 201. The print setting screen extension unit 205 displays a screen on which the user can designate setting values for print functions that can be designated by the print data generation software 202, based on the PC that can be obtained from the OS.

A control 502 is a control item for setting the type of a sheet to be used for printing. For example, items such as “plain paper” and “photo paper” can be set. A control 502 receives a selection of one sheet type from among the sheet types corresponding to the information 404 illustrated in FIG. 4A.

A control 503 is a control item for setting the size of a sheet to be used for printing. The control 503 receives a selection of one sheet size from among sheet sizes (A4, A5, etc.) corresponding to the information 402 illustrated in FIG. 4A. A list 510 illustrated in FIG. 5B is displayed when the control 503 is opened, and the user can select a sheet size from the displayed list.

A control 504 is a control item for setting a sheet feeding tray for print sheets in the printing device 102. For example, items such as “main tray” and “rear tray” can be set. On the control 504, items corresponding to the information 405 illustrated in FIG. 4A are displayed. A list 511 illustrated in FIG. 5C is displayed when the control 504 is opened, and the user can select any one of sheet feeding trays in the displayed list.

A control 505 is a control item for setting the orientation of printing. On the control 505, “portrait” or “landscape” can be set. A control 506 is a control item for enabling or disabling two-sided printing. A control 507 is a control item for setting a binding direction in two-sided printing. For example, items such as “long-edge binding” and “short-edge binding” can be set.

A control 509 is a cancel button to close the screen without reflecting the settings. A control 508 is an OK button to close the screen with the settings reflected.

Figure 5B:
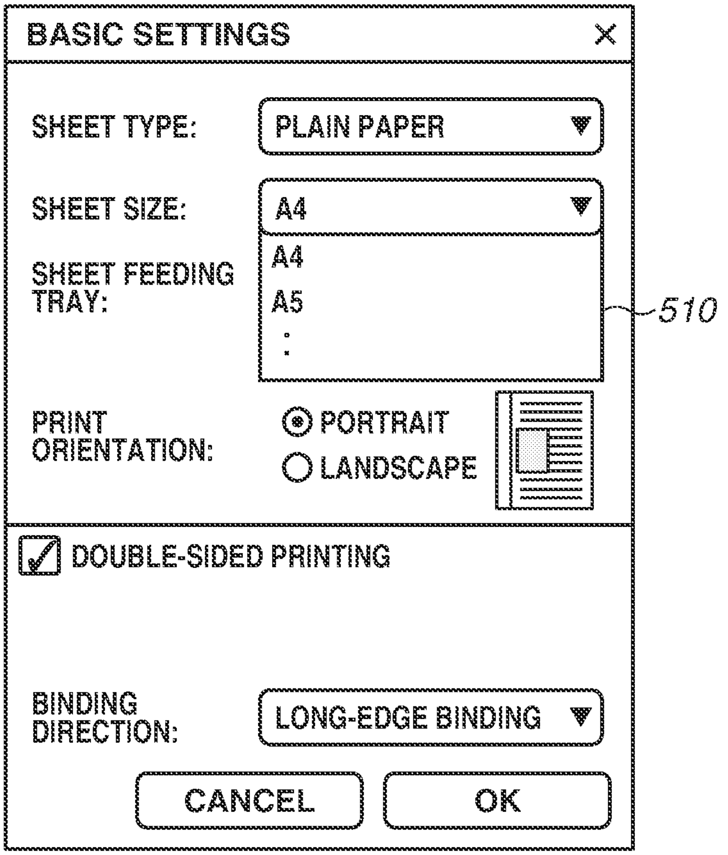
Figure 5C:
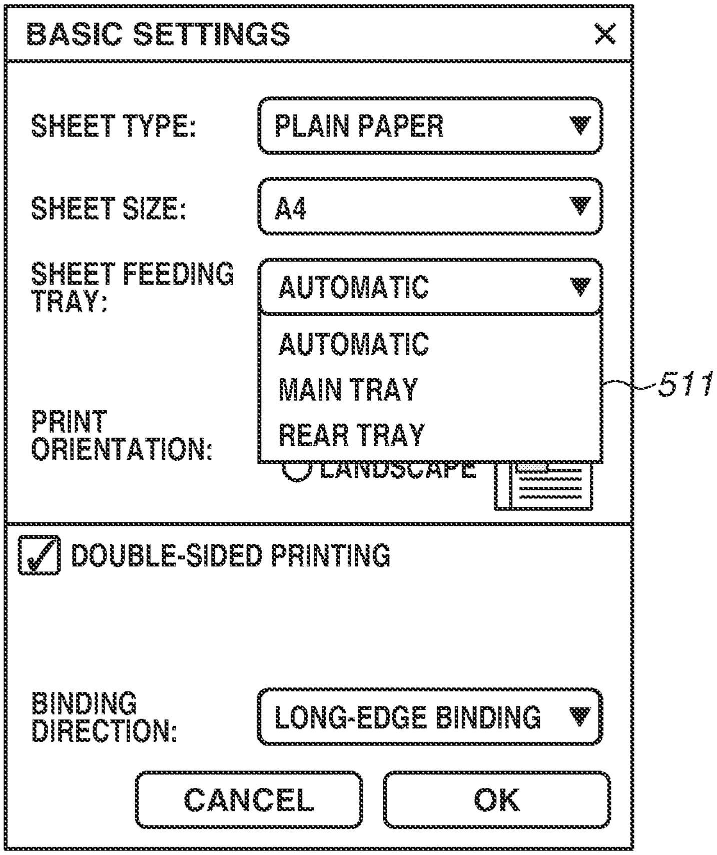

The screens illustrated in FIGS. 5A to 5C are merely examples. In practice, a screen on which other features and options can be set may be configured, and information other than print settings may also be displayed.

On the print setting screen displayed by the print setting screen extension unit 205, constraint rules unique to the extension application 204 can be applied. For example, InvalidCombination in the PDC indicates that “Sheet Type: Envelope” and “Borderless Printing: Enable” are prohibited from being set to one piece of print data at the same time. However, information about which one of the “sheet type” setting and the “borderless printing” setting is to be changed is not described in InvalidCombination. In this point, the setting value for one of the setting items is changed to resolve the constraint using rules stored in the extension application 204.

In the first exemplary embodiment, the print setting screen extension unit 205 performs constraint processing based on the constraint information generated based on media-col-database obtained by the capability information obtaining unit 211 from the printing device 102.

Figure 6A:
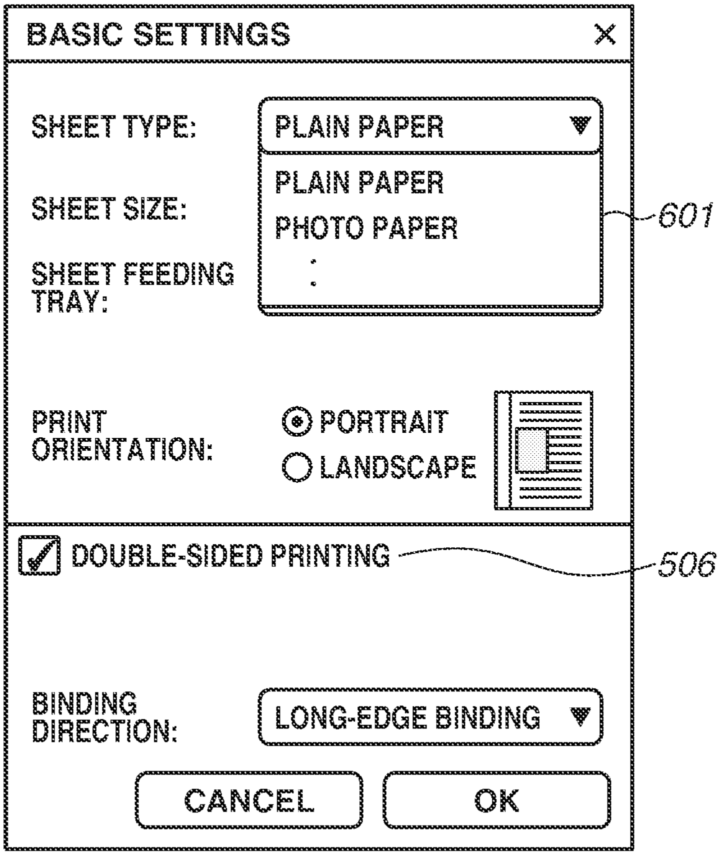
FIGS. 6A and 6B each illustrate an example of the print setting screen on which constraint processing is performed by the print setting screen extension unit.
Figure 6B:
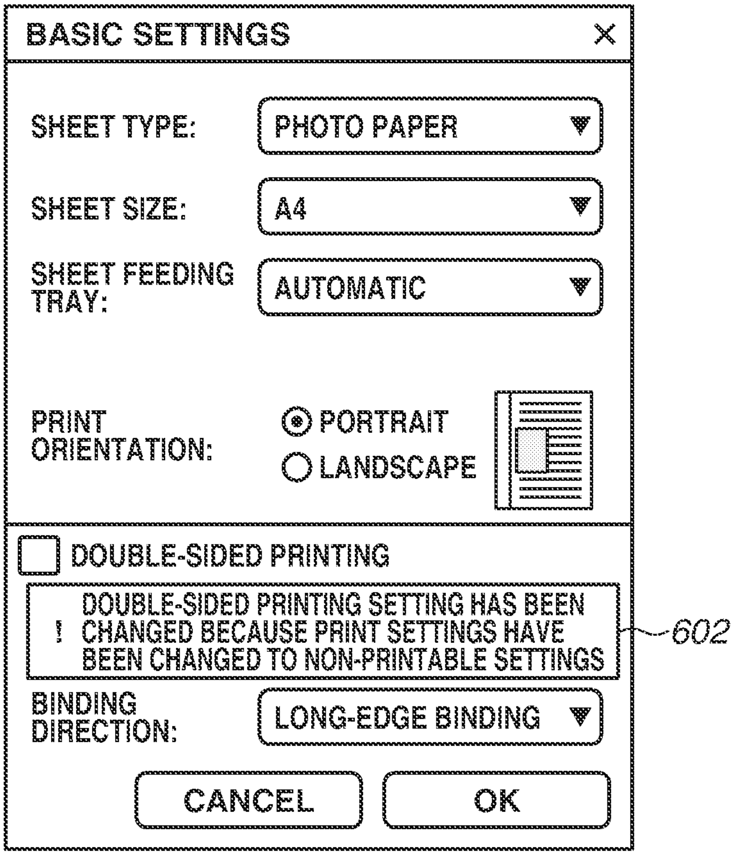

A screen to be displayed when constraint rules unique to the extension application 204 are applied by the print setting screen extension unit 205 will be described with reference to FIGS. 6A and 6B. FIG. 6A illustrates an example of a screen on which the user operates a list 601 that is displayed when the control 502 is opened on the screen 501 to change the sheet type. In the present exemplary embodiment, the description is given of an example where the user has changed the medium to “photo paper” in a state where the control 506 for changing the two-sided printing setting is checked (long-edge binding in the two-sided printing setting is ON). The print setting screen extension unit 205 refers to constraint information generated based on media-col-database obtained by the capability information obtaining unit 211. A combination of “medium: photo paper” and “two-sided printing: long-edge binding” is not described in the media-col-database obtained by the capability information obtaining unit 211 from the printing device 102. In this case, information indicating that “medium: photo paper” and “two-sided printing: long-edge binding” are prohibited from being set to one piece of print data is described in InvalidCombination. The print setting screen extension unit 205 detects that the setting has been changed to the combination described above and performs constraint processing. Specifically, the print setting screen extension unit 205 performs processing of, for example, turning off “two-sided printing: long-edge binding”, or changing the medium to a medium on which printing can be performed with long-edge binding in the two-sided printing setting. FIG. 6B illustrates an example where a notification indicating that constraint processing has been performed when the above-described constraint processing is executed is displayed as a notification text 602 on the print setting screen 501 displayed by the print setting screen extension unit 205. FIG. 6B illustrates an example long-edge binding in the two-sided printing setting is turned off as the above-described constraint processing. Thus, the print setting screen extension unit 205 can extend the print setting screen of the print data generation software 202. On the extended print setting screen, constraint processing unique to the extension application 204 can be executed.

On the print setting screen provided by the print data generation software 202, the OS executes constraint processing at a timing when the user issues a print execution instruction, and a notification indicating that print settings have been changed due to the constraint processing is provided to the user. The OS executes the constraint processing at this timing based on InvalidCombination described in the PDC. On the other hand, the constraint processing can be executed on the print setting screen displayed by the print setting screen extension unit 205 at a timing when the user changes the print settings, and a notification indicating that the constraint processing has been performed can be provided to the user immediately. This allows the user to easily determine which one of the print settings has been determined to be a constraint. Thus, if the constraint processing is performed immediately, the print setting screen extension unit 205 needs to perform unique constraint processing instead of performing the constraint processing by the OS. In the case where the print setting screen extension unit 205 performs the constraint processing, the print setting screen extension unit 205 may use InvalidCombination stored in the PDC or constraint information stored in the shared information 210.

The constraint processing described in the present exemplary embodiment is merely an example. In practice, constraint processing may also be performed on other features and options.

<Example of Information Obtaining Processing Performed by Capability Information Processing Unit>

As described above, the extension application 204 uses the information obtained by the capability information obtaining unit 211 from the printing device 102 when PDC edit processing is performed by the print function extension unit 207 or when the print setting screen is displayed by the print setting screen extension unit 205. In practice, the capability information obtaining unit 211 converts the obtained capability information into a data structure that can be interpreted by the print function extension unit 207 and the print setting screen extension unit 205, and stores the data structure in the shared information 210. The print function extension unit 207 and the print setting screen extension unit 205 read out the information, which is associated with the printing device 102 and is stored in the shared information 210, and performs PDC edit processing or constraint processing on the print setting screen based on the read-out information.

The information obtained by the capability information obtaining unit 211 from the printing device 102 is a response value obtained by issuing the Get-Printer-Attributes operation of the IPP to the printing device 102. The information obtained by the response described above includes basic configuration information and capability information about the printing device 102 as indicated by the information 801, and media-col-database information indicating a list of settable options as print settings as indicated by the information 901. For ease of explanation, information as indicated by the information 801 is referred to as basic capability information and the media-col-database information as indicated by the information 901 is referred to as combination list information.

A timing when the OS issues a PDC edit instruction to the print function extension unit 207 depends on the OS. Further, a timing when the print setting screen extension unit 205 displays the print setting screen depends on a user operation. Thus, at a timing that cannot be controlled by the extension application 204, the processing to be performed by the above-described units is called, and information to be obtained by the capability information obtaining unit 211 from the printing device 102 is required each time. In general, the data size of the basic capability information is relatively small, while the data size of the combination list information is significantly larger than the size of the basic capability information. Each time the capability information obtaining unit 211 performs processing of obtaining information from the printing device 102, the communication load between the host computer 101 and the printing device 102 increases. Additionally, execution of PDC edit processing by the print function extension unit 207 and execution of print setting screen display processing by the print setting screen extension unit 205 may be delayed.

As described above, the response information obtained from the printing device 102 in response to Get-Printer-Attributes is stored in the RAM 113. If an area allocated for the print data generation software 202 or the extension application 204 on the RAM 113 is not sufficient, the basic capability information or the combination list information cannot be successfully obtained in some cases. Also, in a situation where the communication environment with the printing device 102 is unstable, for example, the basic capability information or the combination list information cannot be successfully obtained in some cases. For example, if the data size of the combination list information is extremely large, the information obtaining processing cannot be completed within a time limit determined by the OS, and timeout occurs before the combination list information is obtained. In this case, the subsequent processing may be performed in a state where the combination list information is not yet obtained, which makes it difficult for the print function extension unit 207 and the print setting screen extension unit 205 to normally execute processing. If the basic capability information and the combination list information cannot be successfully obtained, the PDC edit processing to be performed by the print function extension unit 207, the constraint processing to be performed by the print setting screen extension unit 205, and the like cannot be performed. To avoid a situation where communication with the printing device 102 cannot be successfully established, the communication between the capability information obtaining unit 211 and the printing device 102 needs to be reduced to minimum necessary communication. Additionally, it is necessary to take measures to avoid the situation when the communication cannot be successfully established.

A method for taking measures to avoid the situation when information cannot be successfully obtained, while reducing the communication between the capability information obtaining unit 211 and the printing device 102 to minimum necessary communication according to the first exemplary embodiment will be described.

Figure 7:
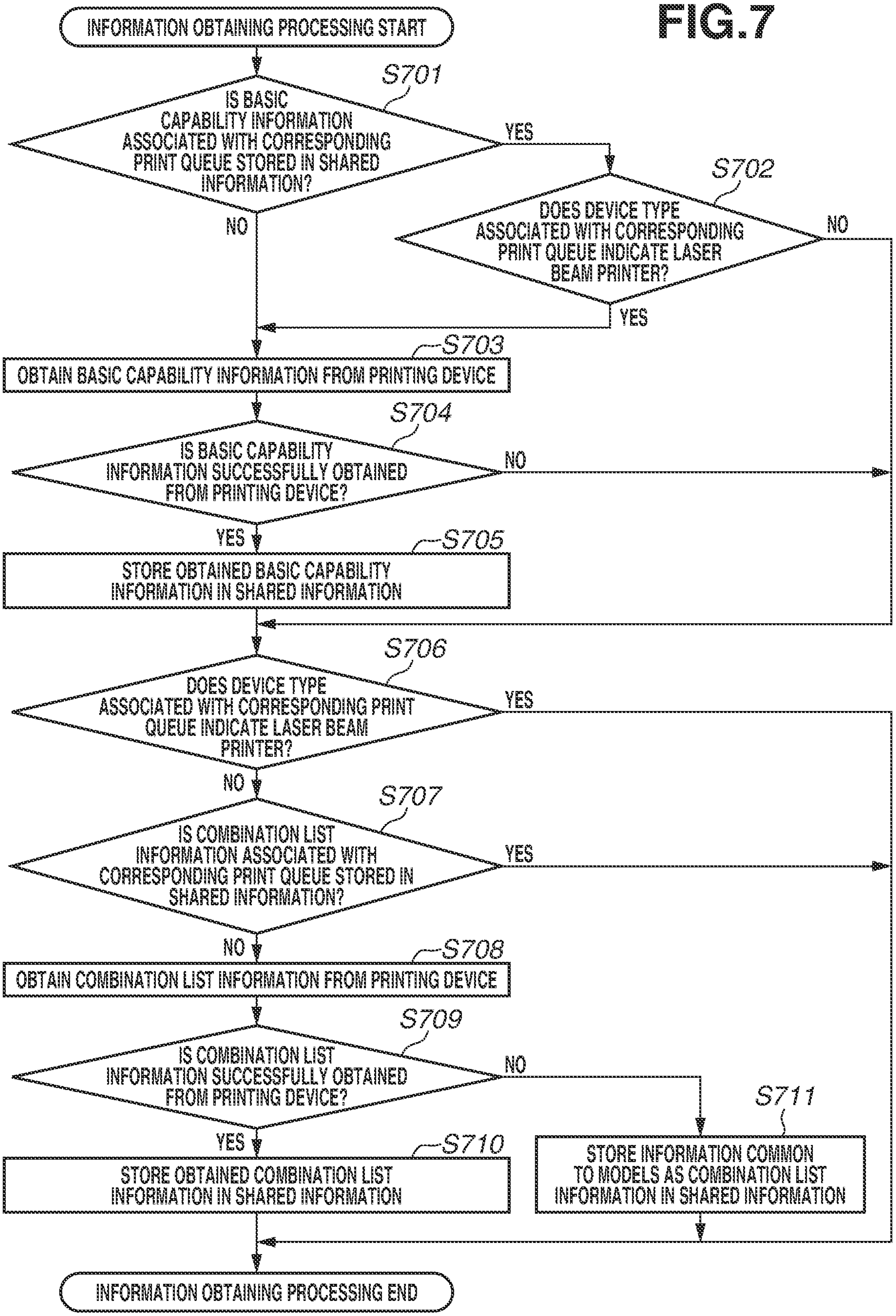
FIG. 7 is a flowchart illustrating processing in which a capability information obtaining unit obtains capability information from a printing device.

FIG. 7 is a flowchart illustrating processing in which the capability information obtaining unit 211 obtains basic capability information and combination list information from the printing device 102. The processing illustrated in FIG. 7 is started when the capability information obtaining unit 211 is started, for example, at a timing when the print function extension unit 207 receives a PDC edit processing instruction from the OS, or at a timing when the print setting screen extension unit 205 displays the print setting screen based on a user operation. The above-described timings are merely examples. In practice, the capability information obtaining unit 211 may be started at a timing other than the above-described timings. A program for executing the processing illustrated in FIG. 7 is stored in the external storage device 114, and the following processing is implemented when the CPU 111 executes the program.

When the capability information obtaining unit 211 is started, the processing of obtaining capability information from the printing device 102 is started. In step S701, the capability information obtaining unit 211 determines whether basic capability information associated with a print queue corresponding to the printing device 102 from which the capability information is to be obtained is stored in the shared information 210 in the extension application 204. The information associated with the print queue corresponding to the printing device 102 will be described below with reference to FIG. 10.

If the basic capability information is not stored in the shared information 210 (NO in step S701), the processing proceeds to step S703. In step S703, the capability information obtaining unit 211 obtains the basic capability information from the printing device 102 using Get-Printer-Attributes of the IPP. FIG. 8 illustrates an example of the basic capability information obtained by the capability information obtaining unit 211 from the printing device 102 in step S703. However, the information 801 illustrated in FIG. 8 is merely an example. In practice, any other information may be obtained as the basic capability information from the printing device 102.

In step S703, the capability information obtaining unit 211 performs processing of obtaining the basic capability information from the printing device 102. Next, in step S704, the capability information obtaining unit 211 determines whether the basic capability information obtaining processing in step S703 is successful. Specifically, the capability information obtaining unit 211 determines whether the basic capability information is loaded into an area allocated for the basic capability information on the RAM 113 and the information corresponding to the basic capability information is not empty. If it is determined that the basic capability information obtaining processing is unsuccessful (NO in step S704), the processing proceeds to step S706.

If it is determined that the basic capability information obtaining processing is successful (YES in step S704), the processing proceeds to step S705. In step S705, the capability information obtaining unit 211 stores the basic capability information obtained from the printing device 102 in the shared information 210 in the extension application 204. FIG. 10 illustrates a data structure 1001 as an example of the data structure of the basic capability information that is obtained by the capability information obtaining unit 211 from the printing device 102 and is stored in the shared information 210. The data structure 1001 indicates that the basic capability information about the printing device 102 is stored in a hierarchical structure including "QueueName" as a key, "DataName", and "Data" in this order. "QueueName" indicates a name that is uniquely assigned to a print queue for the printing device 102 on the OS. The capability information obtaining unit 211 obtains the queue name using the API of the OS. In a lower layer of QueueName, a DataName list is stored as key information indicating attributes of the basic capability information obtained from the printing device 102. In DataName, key information, including the device type of the printing device 102, and the size, medium, sheet feeding tray, constraint information 1, constraint information 2, and the like, which are supported by the printing device 102, is stored. The constraint information is constraint information created by the capability information obtaining unit 211 based on the combination list information obtained from the printing device 102 as described below, and indicates that option values in two items stored in the lower layer are exclusive. In other words, the constraint information is information indicating that option values in two items stored as constraint information cannot be simultaneously set when printing is performed in the printing device 102. In the data structure as described above, the capability information obtaining unit 211 stores the basic capability information about the printing device 102 in a quality equal to the number of print queues corresponding to a plurality of printing devices 102 is stored in the shared information 210. In the first exemplary embodiment, assume that all information to be stored in a storage area by the capability information obtaining unit 211 is stored in a string format. However, in practice, the information may be stored in a data format other than the string format. If the processing illustrated in FIG. 7 is executed for one print queue for the first time, the constraint information and the device type are not stored in the shared information 210 at the time of executing the processing in step S705. In other words, in the case of Queue (1) illustrated in FIG. 10, information about the size, the medium, and the sheet feeding tray is stored in the shared information 210.

In step S705, the capability information obtaining unit 211 determines the device type of the printing device 102 when the capability information obtaining unit 211 stores the basic capability information about printing device 102.

The capability information obtaining unit 211 determines whether information indicating the device type is stored in the shared information 210. If the information indicating the device type is stored, the processing proceeds to step S706. On the other hand, if the information indicating the device type is not stored in the shared information 210, the capability information obtaining unit 211 executes processing illustrated in FIG. 15. The processing in which the capability information obtaining unit 211 determines the device type of the printing device 102 will be described with reference to a flowchart illustrated in FIG. 15.

In step S1501, the capability information obtaining unit 211 determines whether a Get-Printer-Attributes operation response of the IPP from the printing device 102 includes a marker-types attribute. If the capability information obtaining unit 211 determines that the Get-Printer-Attributes operation response includes the marker-types attribute (YES in step S1501), the processing proceeds to step S1502. In step S1502, the capability information obtaining unit 211 determines whether the marker-types attribute value in the Get-Printer-Attributes operation response from the printing device 102 indicates ink-cartridge. If the capability information obtaining unit 211 determines that the marker-types attribute value indicates ink-cartridge (YES in step S1502), the processing proceeds to step S1503. In step S1503, the capability information obtaining unit 211 determines the device type of the printing device 102 to be a locally connected inkjet printer. In step S1503, the capability information obtaining unit 211 writes information indicating that the printing device 102 is an inkjet printer into the shared information 210.

If the capability information obtaining unit 211 determines that the Get-Printer-Attributes operation response does not include the marker-types attribute (NO in step S1501), the processing proceeds to step S1505. In step S1505, the capability information obtaining unit 211 determines whether the Get-Printer-Attributes operation response of the IPP from the printing device 102 includes a printer-supply attribute. If the capability information obtaining unit 211 determines that the Get-Printer-Attributes operation response includes the printer-supply attribute (YES in step S1505), the processing proceeds to step S1506. In step S1506, the capability information obtaining unit 211 determines whether the printer-supply attribute value in the Get-Printer-Attributes operation response includes a character string "type=toner". If the capability information obtaining unit 211 determines that the Get-Printer-Attributes operation response includes the character string "type=toner" (YES in step S1506), the processing proceeds to step S1507. In step S1507, the capability information obtaining unit 211 determines the device type of the printing device 102 to be a laser beam printer. In step S1507, the capability information obtaining unit 211 writes information indicating that the printing device 102 is a laser beam printer into the shared information 210.

If the determination results in steps S1502, S1505, and S1506 indicate "NO", then in step S1504, the print function extension unit 207 determines the device type of the printing device 102 to be other type. The print function extension unit 207 writes information indicating that the device type is other type into the shared information 210.

Figure 15:
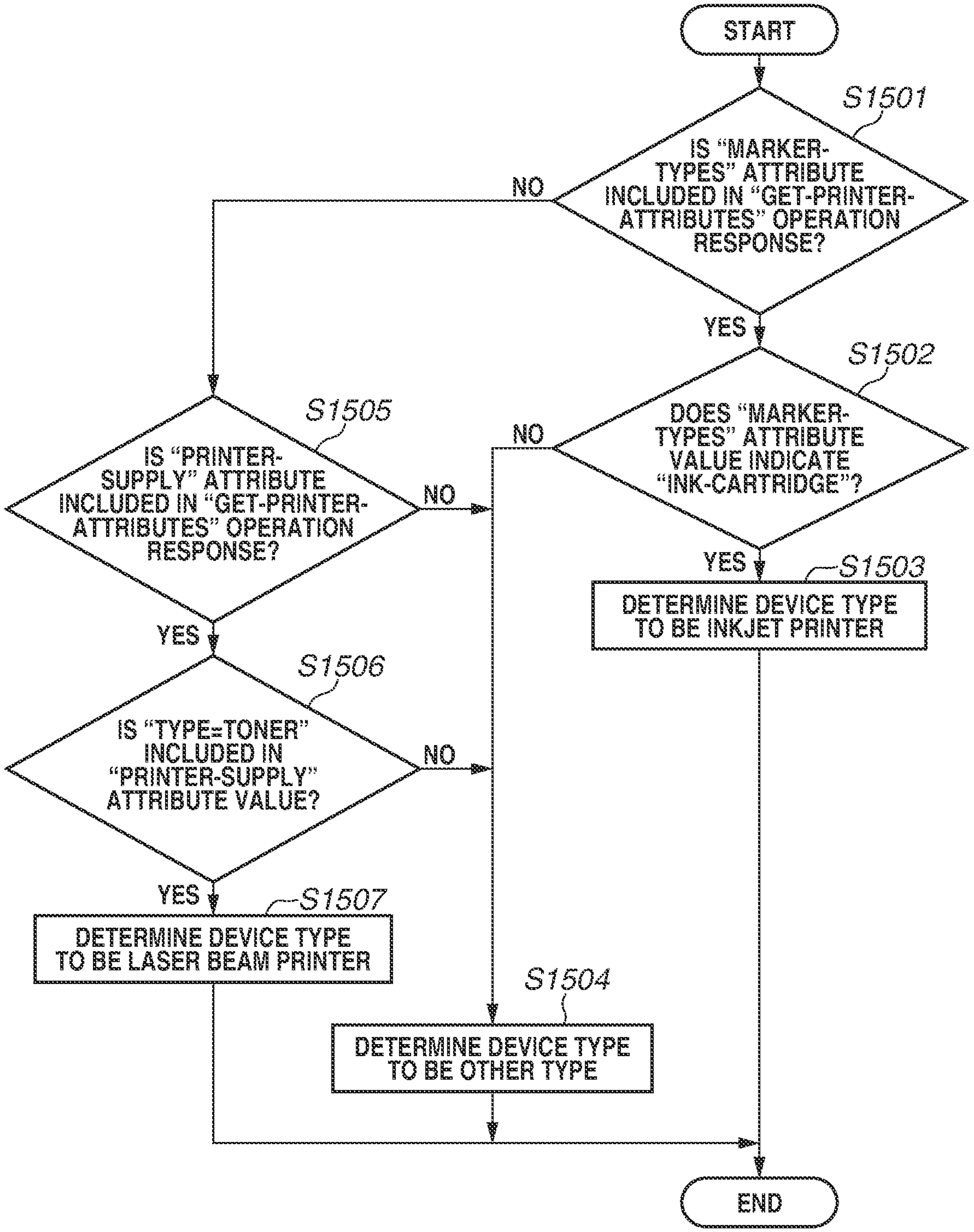
FIG. 15 is a flowchart illustrating processing in which the capability information obtaining unit determines a device type.

In the processing illustrated in FIG. 15, the capability information obtaining unit 211 determines the device type based on the information obtained by the Get-Printer-Attributes operation response of the IPP from the printing device 102, but instead may determine the device type based on information other than the above-described information. For example, the device type may be determined based on information obtained by another method from the printing device 102. Alternatively, the device type may be determined based on information such as the name of the printing device 102 obtained from the printing device 102 and table information included in the extension application 204. The table information may be obtained from a server (not illustrated).

After completion of the processing illustrated in FIG. 15, information about the device type is written into the shared information 210.

If it is determined that the basic capability information is stored (YES in step S701), the processing proceeds to step S702. In step S702, the capability information obtaining unit 211 determines whether the device type of the printing device 102 indicates a laser beam printer. In step S702, the capability information obtaining unit 211 determines whether the device type of the printing device 102 indicates a laser beam printer based on the information stored in the shared information 210. If the device type is not stored in the shared information 210, the capability information obtaining unit 211 executes the processing illustrated in FIG. 15. Then, the capability information obtaining unit 211 executes the determination in step S702 based on the result of the processing illustrated in FIG. 15. If it is determined that the device type indicates a laser beam printer (YES in step S702), the processing proceeds to step S703. If it is determined that the device type does not indicate a laser beam printer (NO in step S702), the processing proceeds to step S706.

After completion of processing in step S705, or if it is determined that the device type does not indicate a laser beam printer in step S702 (NO in step S702), the processing proceeds to step S706. In step S706, the capability information obtaining unit 211 determines whether the device type of the printing device 102 from which the capability information is to be obtained indicates a laser beam printer. Specifically, it is determined whether the device type of the printing device 102 indicates a laser beam printer by referring to information stored in the shared information 210. If it is determined that the device type does not indicate a laser beam printer (NO in step S706), the processing proceeds to step S707. If it is determined that the device type indicates a laser beam printer (YES in step S706), the capability information obtaining unit 211 terminates the capability information obtaining processing.

In step S707, the capability information obtaining unit 211 determines whether the combination list information associated with the print queue corresponding to the printing device 102 from which the capability information is to be obtained is stored in the shared information 210 in the extension application 204. If it is determined that the combination list information is not stored (NO in step S707), the processing proceeds to step S708. If it is determined that the combination list information is stored (YES in step S707), the capability information obtaining unit 211 terminates the capability information obtaining processing.

In step S708, the capability information obtaining unit 211 performs processing of obtaining combination list information from the printing device 102. Next, in step S709, the capability information obtaining unit 211 determines whether the combination list information obtaining processing in step S708 is successful. Specifically, it is determined whether information is loaded into the area allocated for the obtained combination list information on the RAM 113 and the information corresponding to the combination list information is not empty. In step S709, the capability information obtaining unit 211 determines that the combination list information obtaining processing in step S708 is unsuccessful in the following cases. If the capability information obtaining unit 211 has not received a combination list information obtaining completion command within a predetermined period after transmission of a combination list information obtaining request, the capability information obtaining unit 211 determines that the combination list information obtaining processing is unsuccessful. Further, if information is not stored in the area allocated on the RAM 113, to which the capability information obtaining unit 211 writes the combination list information, the capability information obtaining unit 211 determines that the combination list information obtaining processing is unsuccessful. Further, if the combination list information obtained by the capability information obtaining unit 211 is impaired, the capability information obtaining unit 211 determines that the combination list information obtaining processing is unsuccessful.

If it is determined that the combination list information obtaining processing is unsuccessful (NO in step S709), the processing proceeds to step S711.

If it is determined that the combination list information obtaining processing is successful (YES in step S709), the processing proceeds to step S710. In step S710, the capability information obtaining unit 211 generates constraint information based on the combination list information obtained from the printing device 102. All combinations of print settings that can be made in printing on the printing device 102 are described in the combination list information. Accordingly, combinations of print settings that cannot be made in printing on the printing device 102 can be derived by verifying all the combinations. Thus, the capability information obtaining unit 211 derives information about combinations of two items of print settings that cannot be made in printing on the printing device 102, and generates constraint information.

Then, the capability information obtaining unit 211 stores the generated constraint information in the shared information 210. After completion of processing in step S710, the capability information obtaining unit 211 terminates the capability information obtaining processing. The constraint information is written into the shared information 210 by executing the processing in step S710.

If it is determined that the combination list information obtaining processing is unsuccessful (NO in step S709), the processing proceeds to step S711. In step S711, the capability information obtaining unit 211 stores constraint information common to the models preliminarily stored in the shared information 210 of the extension application 204 in the shared information 210 as constraint information associated with the printing device 102. The constraint information common to the models preliminarily stored in the shared information 210 of the extension application 204 indicates constraint information to be applied to the models in common. The constraint information preliminarily stored is used as alternative information when the processing of obtaining the combination list information from the printing device 102 by the capability information obtaining unit 211 is unsuccessful. Specific examples of the constraint information common to the models include constraint information about combinations of media other than "medium: plain paper" and "two-sided printing (short-edge binding/long-edge binding)" and combinations of "borderless printing" and "two-sided printing (short-edge binding/long-edge binding)". FIG. 11 illustrates an example of information to be stored in the shared information as stored information in a case where the capability information obtaining unit 211 has obtained the basic capability information from the printing device 102 but has not successfully obtained the combination list information. If the capability information obtaining unit 211 has not successfully obtained the combination list information from the printing device 102, constraint information common to the models as indicated by Constraints 1 to 12 in information 1101 is stored in the shared information 210 as constraint information about the printing device 102. The pieces of information described as examples of the constraint information common to the models in the first exemplary embodiment are merely examples. In practice, combination information indicating combinations other than combinations of media other than "medium: plain paper" and "two-sided printing (short-edge binding/long-edge binding)" and combinations of "borderless printing" and "two-sided printing (short-edge binding/long-edge binding)" may be used as the constraint information common to the models. After completion of processing in step S711, the capability information obtaining unit 211 terminates the capability information obtaining processing.

The data structure 1001 illustrated in FIG. 10 includes two constraints, i.e., Constraint 1 and Constraint 2. However, the number of constraints that are based on the combination list information obtained from the printing device 102 may be greater than two. The number of constraints generated based on the combination list information may be more or less than the number of pieces of constraint information common to the models.

If the print function extension unit 207 and the print setting screen extension unit 205 request the capability information obtaining unit 211 to obtain capability information from the printing device 102, the capability information obtaining unit 211 executes processing of obtaining capability information and storing the obtained capability information in the shared information 210.

After completion of the processing illustrated in FIG. 7, the print function extension unit 207 executes processing of updating the PDC 203. The print function extension unit 207 updates the PDC 203 based on the shared information 210 stored in step S705, S710, or S711. In this case, the PDC 203 is updated for all setting items and all setting values stored in the shared information 210. This update processing makes it possible to add setting items and setting values that are not written before the extension application 204 is activated to the PDC 203.

One feature of the processing to be performed by the capability information obtaining unit 211 according to the first exemplary embodiment is that once the basic capability information can be obtained from the printing device 102 whose device type is an inkjet printer, the basic capability information is not obtained again from the printing device 102 thereafter. The basic capability information that can be obtained from the printing device 102 whose device type is an inkjet printer is less likely to be changed due to a change in the settings for the main body of the printing device 102, or due to update of the firmware version of the main body. Accordingly, once the basic capability information obtaining processing is completed, there is no need to obtain the basic capability information again in many cases. For this reason, if the basic capability information can be obtained from the printing device 102 whose device type is an inkjet printer, the basic capability information is not obtained again from the printing device 102 thereafter. In subsequent printing, the print function extension unit 207 and the print setting screen extension unit 205 display the print setting screen using the PDC 203. The print setting screen extension unit 205 determines whether there is a print setting that matches a constraint using the constraint information stored in the shared information 210.

The basic capability information is information indispensable for PDC edit processing in the print function extension unit 207. Accordingly, if the basic capability information cannot be obtained from the printing device 102, it may be desirable to attempt to obtain the basic capability information again at a timing when the capability information obtaining processing can be executed.

As described above, according to the first exemplary embodiment, if the basic capability information can be obtained from the printing device 102 whose device type is an inkjet printer, the basic capability information is not obtained again from the printing device 102 thereafter. This configuration makes it possible to reduce the communication load between the host computer 101 and the printing device 102. Another advantageous effect of reducing the time for obtaining information from the printing device 102 and speeding up the processing of the print function extension unit 207 and the print setting screen extension unit 205 can be obtained. Furthermore, even in a case where the basic capability information obtaining processing is unsuccessful, if there is a need to obtain the basic capability information again, it is possible to attempt to obtain the basic capability information again.

As for the printing device 102 whose device type is a laser beam printer, even when the capability information obtained by the capability information obtaining unit 211 is stored in the storage area, the capability information is obtained again. It is assumed that the basic capability information about the printing device 102 whose device type is a laser beam printer may be changed due to a change in configuration information (e.g., a finisher or the like). Accordingly, it may be desirable to obtain the capability information from the printing device 102 each time. The model-specific combination list information held in the printing device 102 whose device type is a laser beam printer is significantly larger than that of the printing device 102 whose device type is an inkjet printer. In the case of performing constraint processing for the laser beam printer, there is also a need to perform the constraint processing on a plurality of options and the method for the constraint processing is complicated. Therefore, the application of the constraint information common to the models without obtaining the combination list information from the printing device 102 whose device type is a laser beam printer makes it possible to reduce the communication load.

Thus, according to the first exemplary embodiment, it is possible to obtain the basic capability information about the printing device 102 in a flexible manner depending on the characteristics of the device type by changing the basic capability information obtaining processing depending on the device type.

One feature of the first exemplary embodiment is that once the combination list information obtaining processing is performed, the combination list information obtaining processing is not performed again regardless of whether the combination list information obtaining processing is successful or not. This is because the data size of the combination list information is larger than the data size of the basic capability information in many cases. In an environment where the capability information obtaining unit 211 has once failed to obtain the combination list information from the printing device 102, there is a possibility that the information obtaining processing cannot be completed within a time limit determined by the OS even when the capability information obtaining unit 211 attempts to obtain the information again. The processing load of the combination list information obtaining processing may be increased because the data size is large. Therefore, in the first exemplary embodiment, if the capability information obtaining unit 211 has failed to obtain the combination list information from the printing device 102, the capability information obtaining unit 211 stores the constraint information common to the models as alternative information for the constraint information about the printing device 102. This configuration prevents the capability information obtaining unit 211 from attempting to obtain the combination list information again.

The constraint information common to the models is used as alternative information for the constraint information about the printing device 102, thereby enabling the print setting screen extension unit 205 to execute minimum constraint processing even when the capability information obtaining unit 211 cannot obtain the combination list information about the printing device 102. The constraint processing to which the model-specific constraint information generated using the combination list information obtained by the capability information obtaining unit 211 from the printing device 102 is applied can be more accurately executed depending on the printing device 102 than the constraint processing to which the constraint information common to the models is applied.

If not even the constraint information common to the models is applied, it is highly likely that a user's mistake in printing may occur or an error may occur in the main body of the printing device 102. For example, according to Constraint 1 in the information 1101, a combination of "medium: photo paper" and "two-sided printing" is a constraint, and printing in which the combination is set on the printing device 102 is limited. Even if the printing device 102 is caused to execute printing in which the combination is set without applying the constraint information common to the models, the printing device 102 does not support two-sided printing on photo paper. Accordingly, on the printing device 102, the setting of two-sided printing may be changed to one-sided printing or the sheet feeding tray may be changed to a sheet feeding tray on which two-side printable media are set, so that printing may be performed on a sheet unintended by the user. It can also be assumed that a phenomenon in which an error occurs on the printing device 102 and printing is suspended occurs. In any case, printing unintended by the user, or an error occurs. Accordingly, it may be desirable for the extension application 204 to limit printing in which the combination that is not supported by the printing device 102 is set as much as possible. Even when the capability information obtaining unit 211 cannot obtain the combination list information about the printing device 102, the print setting screen extension unit 205 may desirably perform constraint processing using the constraint information common to the models.

As described above, according to the first exemplary embodiment, if the basic capability information can be obtained from the printing device 102 once, the basic capability information is not obtained again from the printing device 102 thereafter, thereby making it possible to reduce the communication load between the host computer 101 and the printing device 102. Another advantageous effect of reducing the time for obtaining information from the printing device 102 and speeding up the processing of the print function extension unit 207 and the print setting screen extension unit 205 can be obtained. Furthermore, if the basic capability information obtaining processing is unsuccessful, it is possible to attempt to obtain the basic capability information again. Further, the basic capability information obtaining processing is changed depending on the device type, thereby making it possible to obtain the basic capability information about the printing device 102 in a flexible manner depending on the characteristics of the device type.

Further, if the capability information obtaining unit 211 has failed to obtain the combination list information from the printing device 102, the capability information obtaining unit 211 stores the constraint information common to the models in the shared information 210 as alternative information for the constraint information about the printing device 102. This configuration makes it possible to avoid the processing that may require time, like the processing of obtaining the combination list information again. Furthermore, if the capability information obtaining unit 211 cannot obtain the combination list information about the printing device 102, the constraint information common to the models is used as alternative information for the constraint information about the printing device 102. This configuration enables the print function extension unit 207 to add minimum necessary constraint information to the PDC and enables the print setting screen extension unit 205 to perform minimum necessary constraint processing.

In the first exemplary embodiment, characteristic processing and advantageous effects of the processing in which the capability information obtaining unit 211 obtains the capability information from the printing device 102 have been described. In a second exemplary embodiment, a configuration in which further advantageous effect can be obtained by adding an additional configuration to the configuration according to the first exemplary embodiment will be described. The configurations other than configurations to be described below in the second exemplary embodiment are similar to those of the first exemplary embodiment, and thus descriptions thereof are omitted. Elements added as new configurations in the second exemplary embodiment to a flowchart for capability information obtaining processing to be performed by the capability information obtaining unit 211 will be described.

Figure 12:
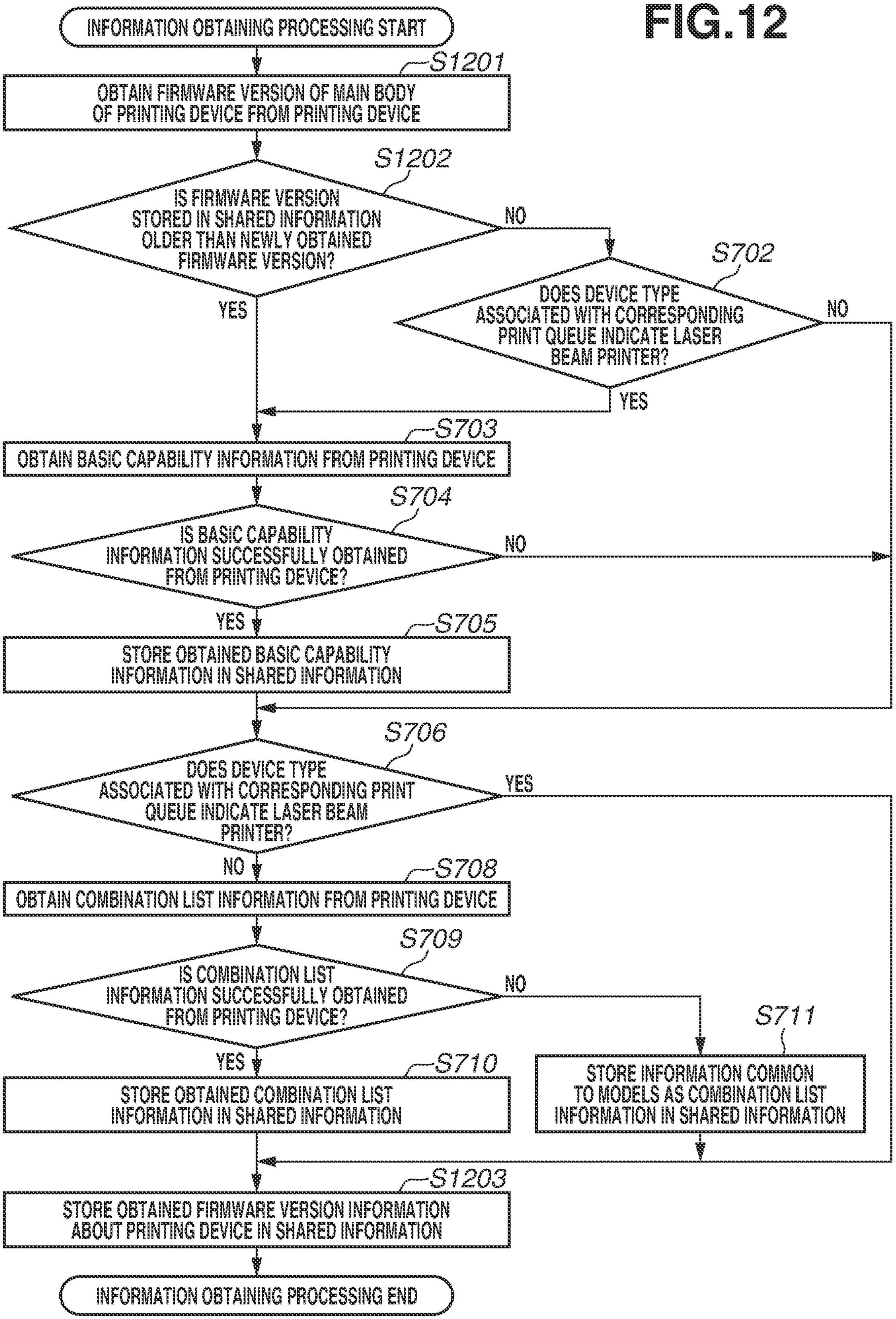
FIG. 12 is a flowchart illustrating processing in which a capability information obtaining unit according to a second exemplary embodiment obtains information.

FIG. 12 is a flowchart illustrating capability information obtaining processing to be performed by the capability information obtaining unit 211 according to the second exemplary embodiment. New reference numerals are given to the new configurations in the second exemplary embodiment, and the other configurations that are similar to those of the first exemplary embodiment are denoted by the same reference numerals and descriptions thereof are omitted.

In the capability information obtaining processing of the capability information obtaining unit 211 according to the second exemplary embodiment, in step S1201, the capability information obtaining unit 211 first obtains the firmware version of the main body of the printing device 102 from the printing device 102. In this case, the firmware version of the printing device 102 is obtained using Get-Printer-Attributes of the IPP. Next, in step S1202, the capability information obtaining unit 211 compares the firmware version of the printing device 102 stored in the shared information 210 with the firmware version of the printing device 102 newly obtained in step S1201. The capability information obtaining unit 211 determines whether the firmware version of the printing device 102 stored in the shared information 210 is older than the newly obtained firmware version of the printing device 102. In the determination in step S1202, the capability information obtaining unit 211 may determine whether the obtained firmware version is different from the firmware version stored in the shared information 210. If the firmware version information is not stored in the shared information 210, or if the stored firmware version is older than the obtained firmware version (YES in step S1202), the processing proceeds to step S703. In the other cases (NO in step S1202), the processing proceeds to step S702.

If the determination result in step S1202 indicates "YES", the capability information obtaining unit 211 executes processing in step S703. If the determination result in step S1202 indicates "NO", the capability information obtaining unit 211 executes processing in step S702. The subsequent processing of steps S702 to S711 is similar to that of the first exemplary embodiment. In the second exemplary embodiment, the capability information obtaining unit 211 executes processing of step S1203 before the information obtaining processing ends. Specifically, the capability information obtaining unit 211 stores the firmware version of the printing device 102 obtained in step S1201 in the shared information 210. In the second exemplary embodiment, the data structure in which the firmware version of the printing device 102 is added to DataName in the data structure 1001 is stored in the shared information 210, thereby making it possible to refer to the latest firmware version of the printing device 102.

As described above, the second exemplary embodiment is characterized in that the firmware version of the printing device 102 is newly stored when the capability information obtaining unit 211 obtains the capability information from the printing device 102, when compared to the first exemplary embodiment. According to the second exemplary embodiment, the capability information obtaining unit 211 detects that the firmware version of the printing device 102 is updated, thereby making it possible to obtain the capability information from the printing device 102 again. Consequently, it is possible to dynamically obtain the capability information without updating the extension application 204 itself, for example, in a case where a function is added by a firmware update of the printing device 102. For example, if the media supported by the printing device 102 are extended by a firmware update of the printing device 102, information about media additionally supported by the printing device 102 can be added to the PDC by performing the capability information obtaining processing again.

In the second exemplary embodiment, the advantageous effect obtained by adding an additional configuration to the processing according to the first exemplary embodiment in which the capability information obtaining unit 211 obtains the capability information from the printing device 102 has been described. In a third exemplary embodiment, a configuration in which further advantageous effect can be obtained by adding an additional configuration to the configuration according to the first exemplary embodiment will be described. The configurations other than configurations to be described below in the third exemplary embodiment are similar to those of the first exemplary embodiment, and thus descriptions thereof are omitted. Elements added as new configurations in the third exemplary embodiment to a flowchart for capability information obtaining processing to be performed by the capability information obtaining unit 211 will be described.

Figure 13:
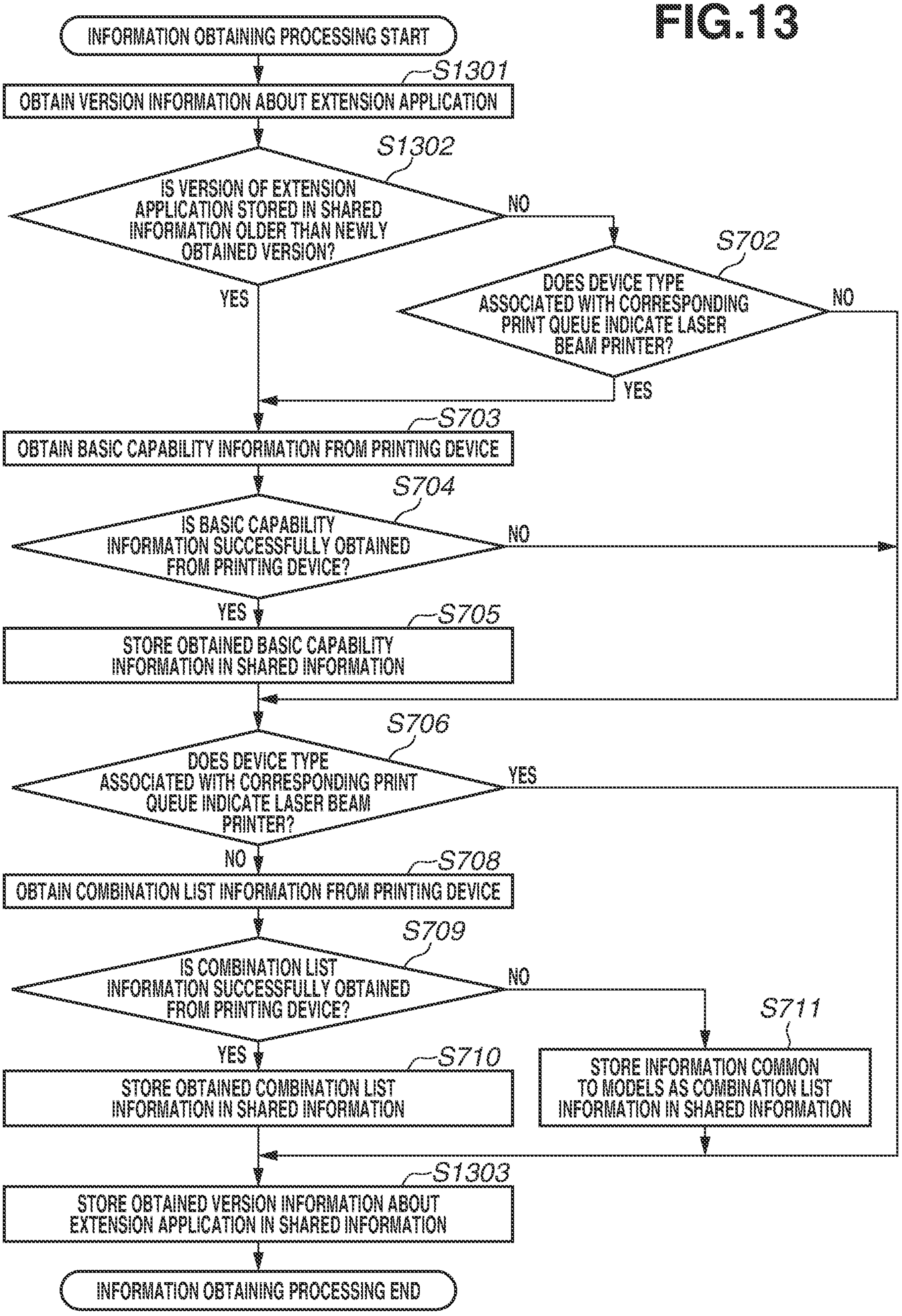
FIG. 13 is a flowchart illustrating processing in which a capability information obtaining unit according to a third exemplary embodiment obtains information.

FIG. 13 is a flowchart for capability information obtaining processing to be performed by the capability information obtaining unit 211 according to the third exemplary embodiment. New reference numerals are given to the new configurations in the third exemplary embodiment, and the other configurations that are similar to those of the first exemplary embodiment are denoted by the same reference numerals and descriptions thereof are omitted.

In the capability information obtaining processing of the capability information obtaining unit 211 according to the third exemplary embodiment, in step S1301, the capability information obtaining unit 211 first obtains version information about the extension application 204. In this case, the application version of the extension application 204 is obtained from the printing device 102 using the API of the OS. Next, in step S1302, the capability information obtaining unit 211 compares the version information about the extension application 204 stored in the shared information 210 with the latest version information about the extension application 204 obtained in step S1301. The version of the extension application 204 stored in the shared information 210 corresponds to the version information about the extension application 204 obtained when the capability information about the printing device 102 is previously obtained. The capability information obtaining unit 211 determines whether the stored version information about the extension application 204 is older than the obtained version information about the extension application 204. Alternatively, the capability information obtaining unit 211 may determine whether the version information about the extension application stored in the shared information 210 is different from the obtained version information about the extension application 204.

If it is determined that the obtained version is older than the stored version (YES in step S1302), the processing proceeds to step S703. If it is determined that the obtained version is not older than the stored version (NO in step S1302), the processing proceeds to step S702. The subsequent processing of steps S702 to S711 is similar to that of the first exemplary embodiment. In the third exemplary embodiment, the capability information obtaining unit 211 executes processing in step S1303 before the information obtaining processing ends. Specifically, the capability information obtaining unit 211 stores the version information about the extension application 204 obtained in step S1301 in the shared information 210. In the third exemplary embodiment, the data structure in which the version information about the extension application 204 is added to DataName in the data structure 1001 is stored in the storage area. This configuration makes it possible to refer to the version information about the extension application 204 at the time when the capability information is obtained from the printing device 102.

As described above, the third exemplary embodiment is characterized in additionally referring to the version information about the extension application 204 obtained when the capability information is obtained by the capability information obtaining unit 211 from the printing device 102, when compared to the first exemplary embodiment. According to the third exemplary embodiment, in a case where the extension application 204 is updated, the capability information obtaining unit 211 can detect that the extension application 204 is updated and the capability information can be obtained again from the printing device 102. With this configuration, if the function of the extension application 204 is extended by the update of the extension application 204 itself, the capability information can be updated without changing the logic of the capability information obtaining processing of the capability information obtaining unit 211.

In the second and third exemplary embodiments, the advantageous effects obtained by adding additional configurations to the processing according to the first exemplary embodiment in which the capability information obtaining unit 211 obtains the capability information from the printing device 102 have been described. In a fourth exemplary embodiment, a configuration in which even further advantageous effect can be obtained by adding an additional configuration to the configuration according to the first exemplary embodiment will be described. The configurations other than configurations to be described below in the fourth exemplary embodiment are similar to those of the first exemplary embodiment, and thus descriptions thereof are omitted. Elements added as new configurations in the fourth exemplary embodiment to a flowchart for capability information obtaining processing to be performed by the capability information obtaining unit 211 will be described. The current time may be obtained from the OS of the host computer 101, or may be obtained from the printing device 102.

Figure 14:
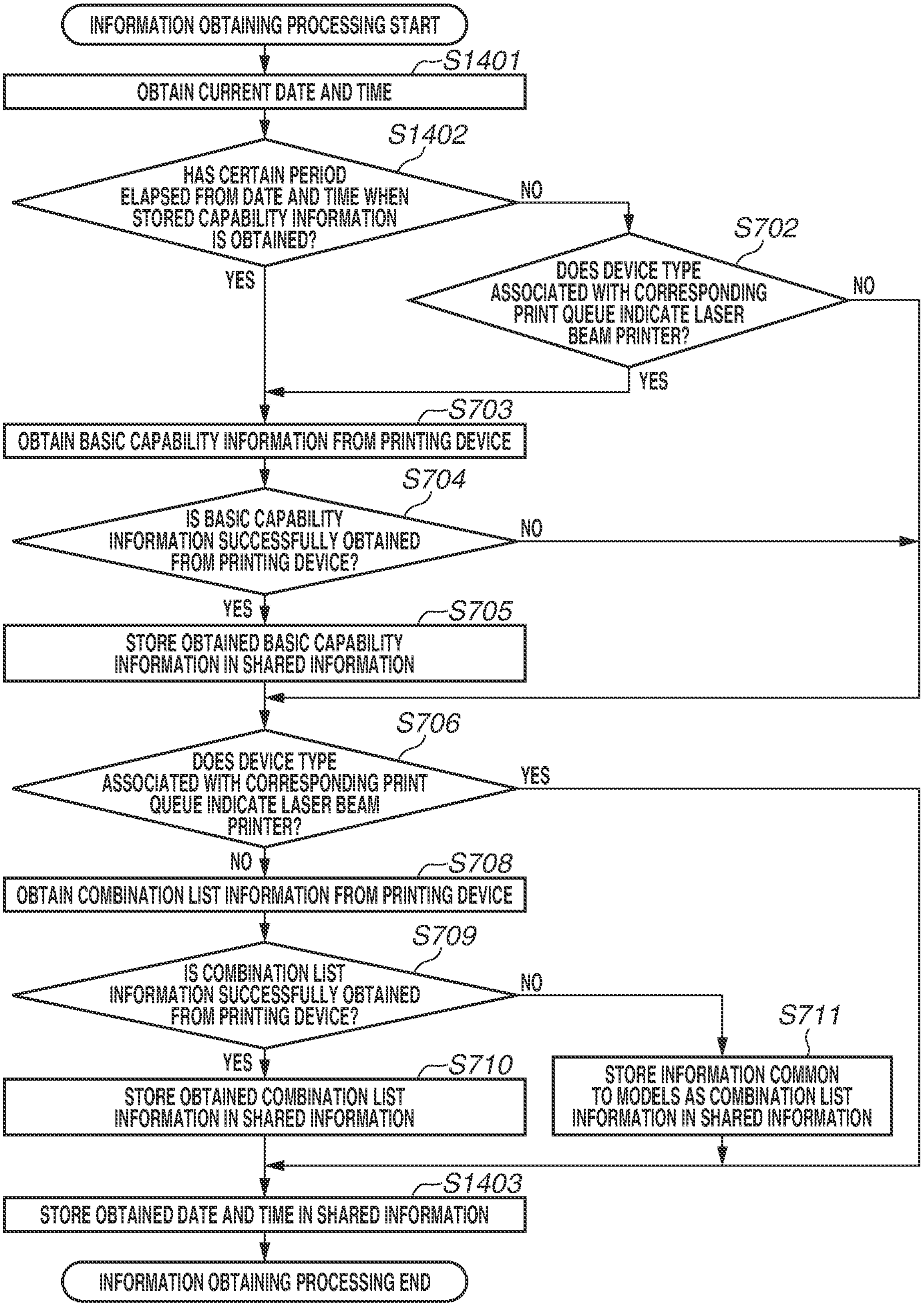
FIG. 14 is a flowchart illustrating processing in which a capability information obtaining unit according to a fourth exemplary embodiment obtains information.

FIG. 14 is a flowchart illustrating capability information obtaining processing to be performed by the capability information obtaining unit 211 according to the fourth exemplary embodiment. New reference numerals are given to the new configurations in the fourth exemplary embodiment, and the other configurations that are similar to those of the first exemplary embodiment are denoted by the same reference numerals and descriptions thereof are omitted.

In the capability information obtaining processing of the capability information obtaining unit 211 according to the fourth exemplary embodiment, in step S1401, the capability information obtaining unit 211 first obtains the current date and time when processing in step S1401 is executed. The capability information obtaining unit 211 obtains the current date and time using the API of the OS.

Next, in step S1402, the capability information obtaining unit 211 compares the date and time which is stored in the shared information 210 and indicates the date and time when the capability information about the printing device 102 is obtained, with the current date and time newly obtained in step S1401. Then in step S1402, the capability information obtaining unit 211 determines whether a certain period has elapsed from the stored date and time when the capability information about the printing device 102 is obtained. The certain period may be, for example, one month or one year, and can be arbitrarily set by the developer of the extension application 204, or can be arbitrarily set by the user. If it is determined that the certain period has elapsed (YES in step S1402), the processing proceeds to step S703. If it is determined that the certain period has not elapsed (NO in step S1402), the processing proceeds to step S702. The subsequent processing of steps S702 to S711 is similar to that of the first exemplary embodiment. In the fourth exemplary embodiment, the capability information obtaining unit 211 executes processing in step S1403 before the information obtaining processing ends. Specifically, the capability information obtaining unit 211 stores the current date and time obtained in step S1401 in the shared information 210. In the fourth exemplary embodiment, the data structure in which information about the date and time when the capability information is obtained is added to DataName in the data structure 1001 is stored in the shared information 210, thereby making it possible to refer to information about the date and time when the capability information is obtained from the printing device 102.

As described above, the fourth exemplary embodiment is characterized in additionally referring to information about the current date and time when the capability information obtaining unit 211 obtains the capability information from the printing device 102, when compared to the first exemplary embodiment. According to the fourth exemplary embodiment, it is possible to detect a lapse of a certain period from the time when the capability information obtaining unit 211 has last obtained the capability information from the printing device 102, and to obtain the capability information again from the printing device 102. Consequently, the capability information updated when the firmware version of the printing device 102 is updated within a predetermined period can be reflected in the PDC and the shared information 210.

Other Embodiments

In the first to fourth exemplary embodiments, an example of the processing in which the host computer 101 obtains the capability information from the printing device 102 has been described. The capability information about the printing device 102 can be registered on a cloud print service, and the host computer 101 can transmit print data to the printing device 102 via the cloud print service. In this case, the host computer 101 obtains the capability information from the cloud print service. The host computer 101 may perform processing similar to that according to the first to fourth exemplary embodiments in the case of obtaining the capability information from the cloud print service. In this case, the processing illustrated in FIG. 7 and FIGS. 12 to 15 is executed based on the capability information obtained by the capability information obtaining unit 211 from the cloud print service.

According to an aspect of the present disclosure, it is possible to execute predetermined processing even when an extension application has failed to obtain information from a printing device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-063874, filed Apr. 11, 2023, which is hereby incorporated by reference herein in its entirety.

What is claimed is:

1. A non-transitory storage medium storing an application configured to display a print setting screen, the application, when executed, causing an information processing apparatus to implement a control method, the control method comprising:

obtaining first attribute information and second attribute information from a printing device via a network;

storing, in a storage unit, first information based on the obtained first attribute information and second information based on the obtained second attribute information; and controlling the print setting screen to be displayed based on the first information and the second information stored in the storage unit, wherein the second information is information indicating a combination of setting values that are prohibited from being set to one piece of print data, and wherein in a case where the second attribute information is not successfully obtained due to a communication timeout or a data size of the second attribute information exceeding a predetermined threshold, a plurality of prohibited combinations stored in the application in advance as common information is stored as the second information in the storage unit.

2. The non-transitory storage medium according to claim 1, wherein the first attribute information is information about a setting item settable for printing in the printing device.

3. The non-transitory storage medium according to claim 2, wherein the second attribute information is information indicating a combination of setting values settable for printing using the printing device.

4. The non-transitory storage medium according to claim 1, wherein the control method further includes determining whether the first information is stored in the storage unit, and wherein, if it is determined that the first information is not stored, the first attribute information is obtained.

5. The non-transitory storage medium according to claim 4, wherein the control method further includes determining whether the second information is stored in the storage unit, and wherein, if it is determined that the second information is not stored, the second attribute information is obtained.

6. A control method for an information processing apparatus storing an application configured to display a print setting screen, the control method comprising:

obtaining first attribute information and second attribute information from a printing device via a network;

storing, in a storage unit, first information based on the obtained first attribute information and second information based on the obtained second attribute information; and controlling the print setting screen to be displayed based on the stored first information and the stored second information stored in the storage unit, wherein the second information is information indicating a combination of setting values that are prohibited from being set to one piece of print data, and wherein, in a case where the second attribute information is not successfully obtained due to a communication timeout or a data size of the second attribute information exceeding a predetermined threshold, a plurality of prohibited combinations, information stored in the application in advance is stored as the second information in the storage unit.

7. The control method according to claim 6, wherein the first attribute information is information about a setting item settable for printing in the printing device.

8. The control method according to claim 7, wherein the second attribute information is information indicating a combination of setting values settable for printing using the printing device.

9. The control method according to claim 6, wherein the control method further includes determining whether the first information is stored in the storage unit, and wherein, if it is determined that the first information is not stored, the first attribute information is obtained.

10. The control method according to claim 9, wherein the control method further includes determining whether the second information is stored in the storage unit, and wherein, if it is determined that the second information is not stored, the second attribute information is obtained.

11. An information processing apparatus comprising a processor and a memory storing an application configured to display a print setting screen, the processor executing the application to cause the information processing apparatus to:

obtain first attribute information and second attribute information from a printing device via a network;

store first information based on the obtained first attribute information and second information based on the obtained second attribute information; and display the print setting screen based on the stored first information and the stored second information, wherein the second information is information indicating a combination of setting values that are prohibited from being set to one piece of print data, and wherein, in a case where the second attribute information is not successfully obtained due to a communication timeout or a data size of the second attribute information exceeding a predetermined threshold, a plurality of prohibited combinations, information stored in the application in advance as common information is stored as the second information.

12. The information processing apparatus according to claim 11, wherein the first attribute information is information about a setting item settable for printing in the printing device.

13. The information processing apparatus according to claim 12, wherein the second attribute information is information indicating a combination of setting values settable for printing using the printing device.

14. The information processing apparatus according to claim 11, wherein executing the application by the processor further causes the information processing apparatus to determine whether the first information is stored, and wherein, if it is determined that the first information is not stored, the first attribute information is obtained.

15. The information processing apparatus according to claim 14, wherein executing the application by the processor further causes the information processing apparatus to determine whether the second information is stored, and wherein, if it is determined that the second information is not stored, the second attribute information is obtained.

* * * * *